(12) United States Patent
Petrovich

(10) Patent No.: US 8,751,943 B1
(45) Date of Patent: Jun. 10, 2014

(54) SYSTEM AND METHOD FOR PRESENTING VIEWS OF DIALOGUES TO A USER

(71) Applicant: Tumakov Ivan Petrovich, Vladivostok (RU)

(72) Inventor: Tumakov Ivan Petrovich, Vladivostok (RU)

(73) Assignee: Zotobi Management Ltd., Tortola (VG)

( * ) Notice: Subject to any disclaimer, the term of this patent is extended or adjusted under 35 U.S.C. 154(b) by 0 days.

(21) Appl. No.: 13/748,967

(22) Filed: Jan. 24, 2013

(51) Int. Cl.
*G06F 3/048* (2013.01)

(52) U.S. Cl.
USPC .......................................................... 715/753

(58) Field of Classification Search
USPC ................................................ 715/753, 840
See application file for complete search history.

(56) References Cited

U.S. PATENT DOCUMENTS

| | | | |
|---|---|---|---|
| 5,848,058 A * | 12/1998 | Ooyoshi et al. | 370/244 |
| 6,351,764 B1 * | 2/2002 | Voticky et al. | 709/207 |
| 6,832,244 B1 * | 12/2004 | Raghunandan | 709/206 |
| 7,266,186 B1 * | 9/2007 | Henderson | 379/142.04 |
| 7,454,716 B2 * | 11/2008 | Venolia | 715/853 |
| 8,402,374 B1 * | 3/2013 | Rose | 715/733 |
| 2002/0038213 A1 * | 3/2002 | Adachi | 704/257 |
| 2003/0130849 A1 * | 7/2003 | Durston et al. | 704/270 |
| 2004/0015548 A1 * | 1/2004 | Lee | 709/204 |
| 2004/0021686 A1 * | 2/2004 | Barberis | 345/738 |
| 2005/0068167 A1 * | 3/2005 | Boyer et al. | 340/531 |
| 2005/0114871 A1 * | 5/2005 | Wolff et al. | 719/331 |
| 2005/0193345 A1 * | 9/2005 | Klassen et al. | 715/751 |
| 2006/0084450 A1 * | 4/2006 | Dam Nielsen et al. | 455/466 |

* cited by examiner

*Primary Examiner* — Phenuel Salomon
(74) *Attorney, Agent, or Firm* — Pillsbury Winthrop Shaw Pittman LLP

(57) ABSTRACT

A system and method for providing views of dialogues to a user defines a user interface that conveys the views of the dialogues. The views of dialogues include a display of notifications that may provide information about relative positions in an array wherein the dialogues are assigned to corresponding positions and may provide indications of directions about the dialogues with respect to a dialogue being presented in a current view. In some examples, the dialogues may be assigned to corresponding array positions dynamically based on information regarding the dialogues, such as the time information. In some examples, the notifications may also be generated based on information regarding the dialogues such as the time information. Additional criteria may be provided by the user to customize the array determination and/or the notification generation.

14 Claims, 13 Drawing Sheets

TIME: T+1

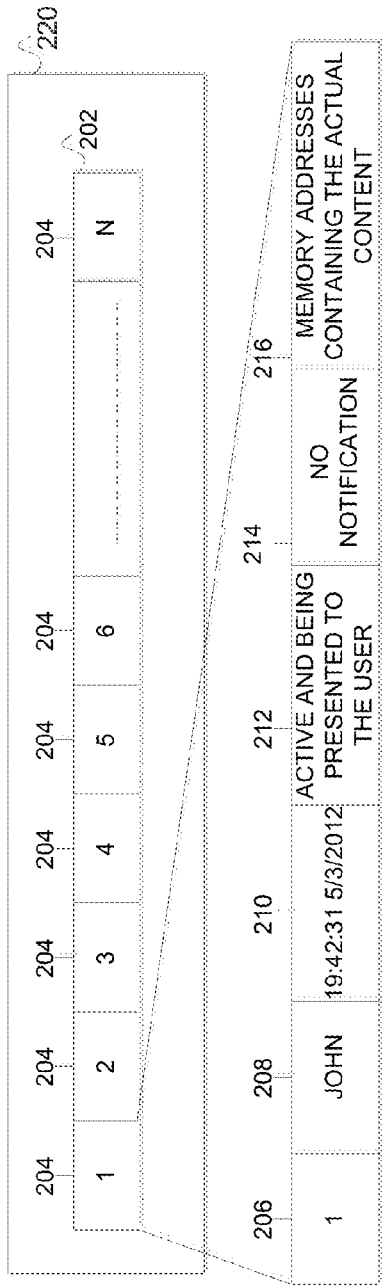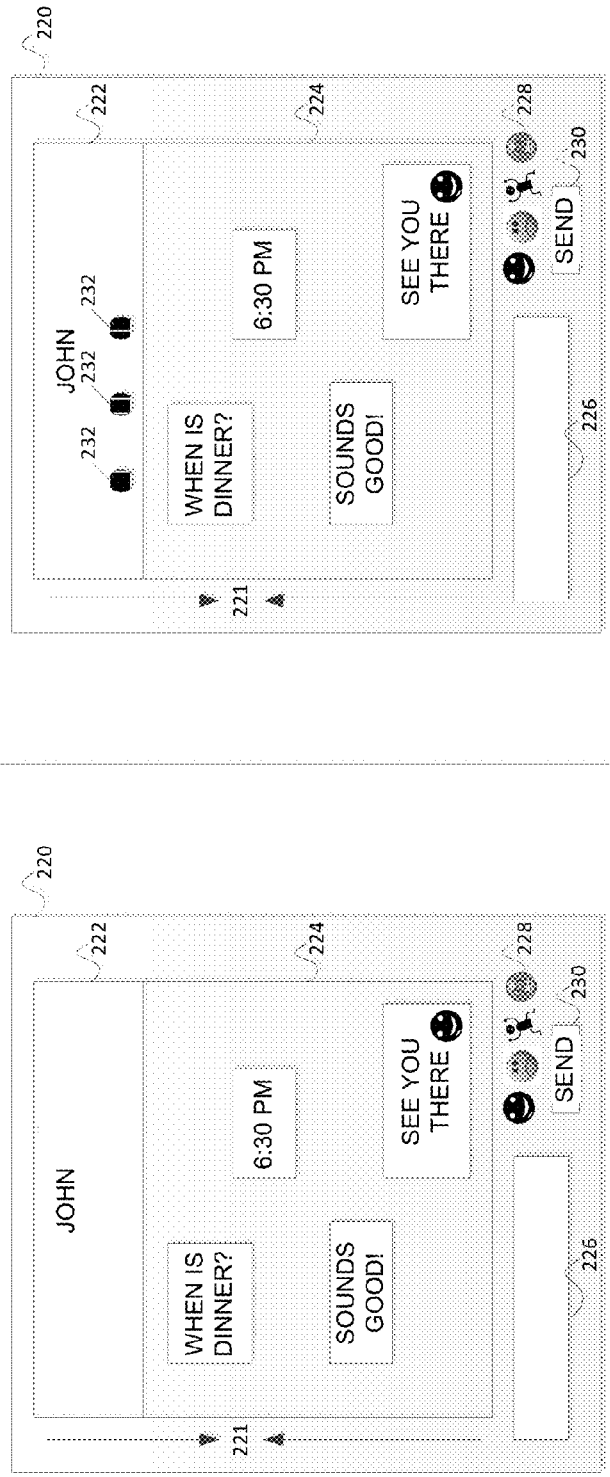

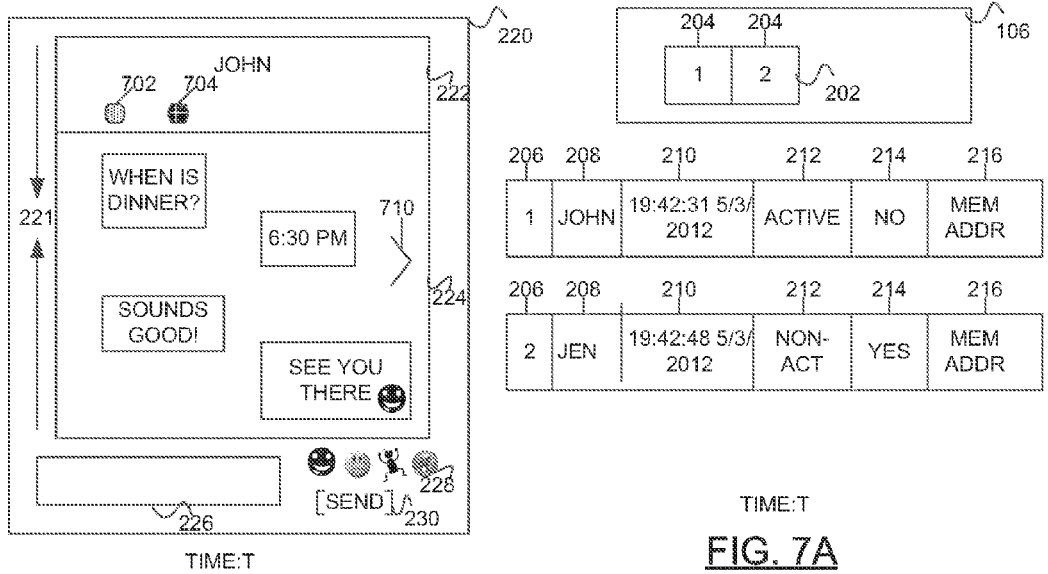
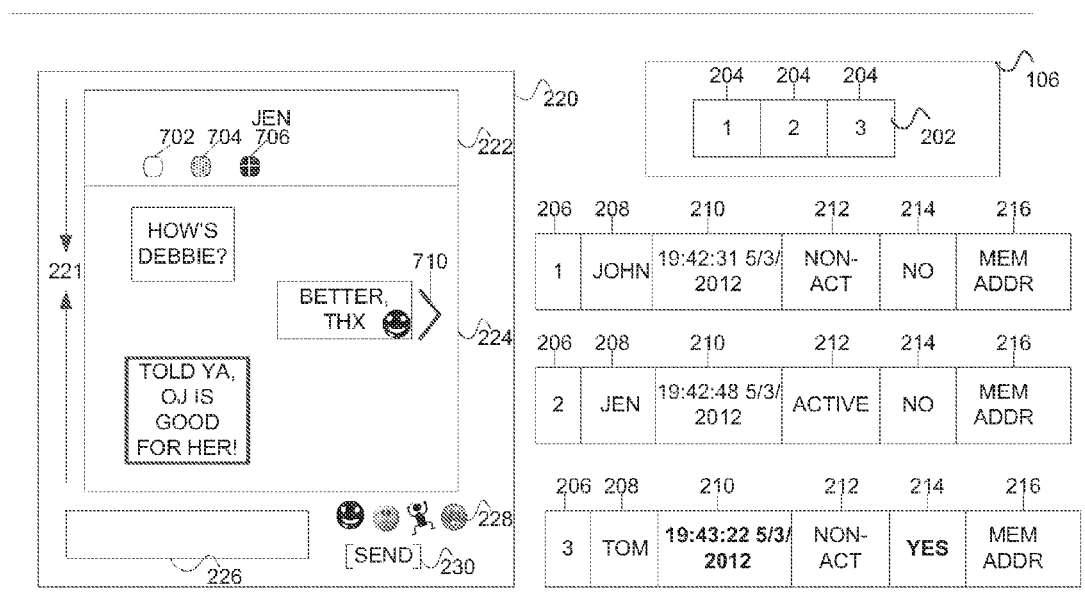

FIG. 19

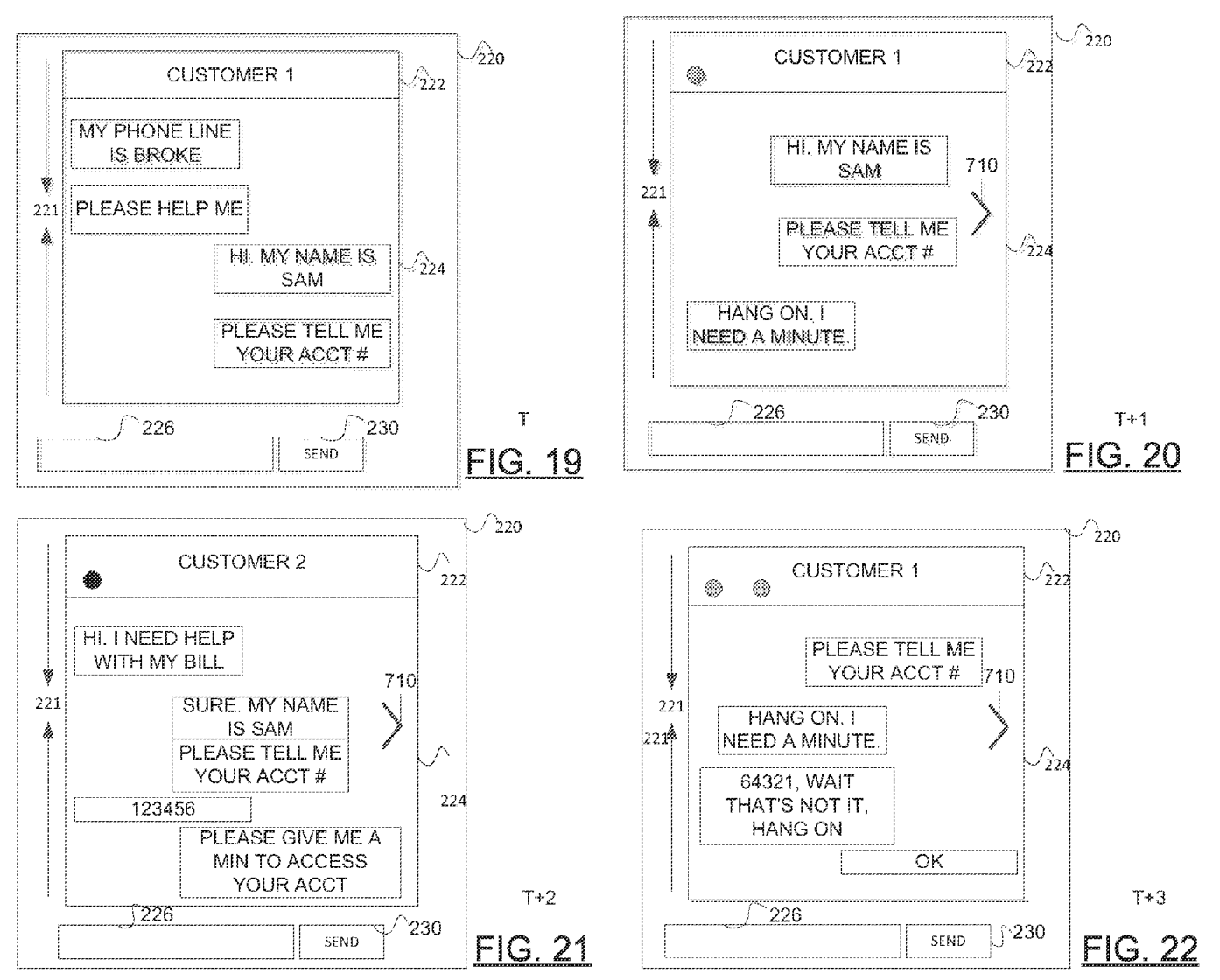

CUSTOMER 1

MY PHONE LINE IS BROKE

PLEASE HELP ME

HI. MY NAME IS SAM

PLEASE TELL ME YOUR ACCT #

SEND

CUSTOMER 1

HI. MY NAME IS SAM

PLEASE TELL ME YOUR ACCT #

HANG ON, I NEED A MINUTE

SEND

CUSTOMER 2

HI, I NEED HELP WITH MY BILL

SURE. MY NAME IS SAM PLEASE TELL ME YOUR ACCT #

123456

PLEASE GIVE ME A MIN TO ACCESS YOUR ACCT

SEND

CUSTOMER 1

PLEASE TELL ME YOUR ACCT #

HANG ON, I NEED A MINUTE

64321, WAIT THAT'S NOT IT, HANG ON

OK

SEND

T+3

US 8,751,943 B1

SYSTEM AND METHOD FOR PRESENTING VIEWS OF DIALOGUES TO A USER

FIELD OF THE DISCLOSURE

This disclosure relates to presenting a view of one or more dialogues to a user through a user interface, the view being configured to present a view of the dialogues and as well as information regarding other dialogues, and the user interface may, based on the information regarding the other dialogues displayed in that view, convey a view of a different dialogues to the user.

BACKGROUND

Systems that present views of dialogues to a user are known, such as a messenger implemented in a mobile device like smartphones and tablets. In such systems, a view of one or more dialogues selected by the user may be presented to the user on a display. Also in such systems, to select a view of other dialogues different from the ones in the current view being presented on the display, the user may be required to select a view listing information regarding different dialogues, locate and select the different dialogues from the list, and instruct the systems to present a view of the different dialogues on the display. For example, to select a view of dialogues received from a different contact person than a contact person with whom the user is engaging in a dialogue being presented in a view on the display, the user may need to select a view of a contact person list, locate and select the different contact person, and instructs the system to present dialogues received from the different contact person in a view on the display. As an improvement, some systems provide notifications in a current view of a dialogue notifying the user of a newly received message from another contact person. These systems allow the user to select and view the newly received message in the current view by tapping on the notification, which will switch the current view to a view that displays the dialogue containing the new message. This enables the user to view new messages without resorting to the list or index describing all dialogues. However, in situations when multiple messages received in different dialogues, the user may not efficiently select and view the dialogues based on a relationship among the dialogues, e.g., viewing the high priority ones first and skipping some of the low priority ones.

SUMMARY

One aspect of the disclosure relates to a system and method of presenting views of dialogues to a user such that the user may traverse between or among dialogues without referencing a dialogue list or index. To achieve this, the system and method determines an array to be associated with the dialogues and assigns positions within the array to the dialogues. Within a view of dialogue being presented on a display, a directional input may be received from the user. The directional input may be used by the system and method to determine a dialogue within the array and convey a view of that dialogue to the user. This may provide the user a convenient and efficient way to traverse between or among dialogues with a reduced number of inputs as compared to the conventional dialogue view presenting methods.

Another aspect the disclosure relates to presenting the views of the dialogues to include notifications that convey information about relative positions in the array of the dialogues for which notifications were generated with respect to the dialogue being presented in a current view. Notifications may be generated and displayed in the current view to notify the user of information regarding the dialogues not being presented in the current view. The relative array position information may be conveyed by arranging the notifications displayed in the current view based on the array positions of the dialogues for which the notifications were generated. Directional indication may also be included in the current view to assist the user in providing the directional input for traversing dialogues in the array. This may enable the user to efficiently and accurately traverse to a notified dialogue.

In some implementations, the system may include one or more processors configured to execute computer program modules including a dialogue management module, a dialogue representation module, a notification module, a user input module, and a customization module.

The dialogue representation module may be configured to define a user interface that conveys a view of a dialogue on a display. A user may engage in a dialogue with one or more entities, such as, another user, a group of users, a website, an organization and/or any other entities that may communicate with the user using a dialogue. Dialogues may include communications between the user and the entities including, but not limited to, text messages, e-motions, graphics, questions and responses in any suitable form, files and/or any other suitable forms of communications between the user and the entities in a dialogue. Dialogues may be presented in a view on a display, e.g. a screen of a mobile device such as, but not limited to, a smartphone or a tablet. The view may present information associated with a dialogue. The information associated with the dialogue may include title, status, place, name or names of the entities, content and/or any other suitable information associated with a dialogue between a user and the entities. The view may present the dialogue in however presentation forms as appropriate for the user. For example, the view may present the dialogue in fields on a display to the user, wherein the user's text messages may be presented in fields on a first side of the view and other entities' text messages may be presented in fields on a second side of the view. The fields may be arranged vertically according to timestamps of the fields, according to their levels of importance as determined by the user and/or any other suitable criteria that may be used to arrange messages in a view.

Within a view of a dialogue currently being presented to the user on a display, one or more notifications may be displayed to convey to the user about information regarding other dialogues not presented in the view. The notifications may be displayed in the view to indicate relative positions of the dialogues for which the notifications were generated with respect to the dialogue being presented in the view such that the user may traverse to the notified dialogues on the display by providing directional inputs.

The user interface may be defined to enable the user acquire information regarding notified dialogues through the display of notifications. The user interface may be defined to display one or more indications indicating the relative positions of the notified dialogues with respect to the dialogue being presented on the display. In response to a directional input from the user, the dialogue representation module may be configured to provide a view of a notified dialogue on the display based on the user's input.

The dialogue management module may be configured to associate dialogues between the user and other entities with individual positions in a spatial array. The array may be, for example, a two dimensional or three dimensional arrays. Information characterizing the dialogues may be associated with the corresponding positions in the array. Such information may include, for example, time information (e.g., timestamps, time zone and/or etc.), location markers indicating places where the dialogues take place, language used, entities involved, keywords used, content of the dialogues and/or any other suitable information characterizing the dialogues. In implementations in which the array is a two-dimensional array, the positions may be numbered, for example from left to right, as positions 1, 2, 3 and so on. The individual dialogues may be associated with the numbered positions. The association of dialogues with positions in the array, e.g., a sequence of the dialogues in the array, may be determined dynamically based on criteria such as timestamps of the dialogues, names of the entities associated with the dialogues, user defined or predetermined level of importance assigned to the dialogues and/or any other suitable criteria for arranging dialogues. The user may be enabled, e.g., through a settings interface, to select and customize criteria to determine the positions in the array associated with the dialogues.

The notification management module may be configured to generate notifications regarding the dialogues between the user and other entities. The notifications may be generated based on information regarding the dialogues. For example, time information associated with dialogues may be used such that newly received communications may be notified to the user. The notifications may be arranged to provide information about spatial relationship between or among notified dialogues. Such information may be used to determine the positions of the array that comprises the notified dialogues. The notification management module may be configured to determine a period of notification and remove a notification whose period has expired.

The user input module may be configured to determine user's input. The user input may be directional to cause traversal of the dialogues associated with the positions in the array. The user's input may include finger swipe, mouse click, trackball movement, movement on touch pad, and/or pointer movements, keyboard input, motion (e.g., user's body motions as detected by a motion sensor sensing, such as user's arm movement), voice command and/or any other suitable user input. The user's input module may be configured to determine the user input, for example but not limited to, the direction of the finger swipe, the direction of mouse click, the direction of touchpad movement, trackball and/or pointer's movement and/or an interpretation of the user's voice commands, and/or user's motion. The direction of the user input may be used to determine an offset, which can enable the traversal of the dialogues in the array from the position of the dialogue being presented in a current view.

The customization module may be configured to provide a setting interface that is defined such that the user may customize, for example, criteria by which the dialogue management module may determine and/or arrange the array of the dialogues. Such criteria may include timestamps of the dialogues, names of the entities associated with the dialogues user defined or predetermined level of importance assigned to the dialogues and/or any other suitable criteria for arranging dialogues. The setting interface may also be defined to enable the user to customize criteria by which the notification management module generates the notifications regarding the dialogues. Such notification criteria may include keywords and/or phrases used in the dialogue, names of the entities associated with the dialogues, user defined or predetermined level of importance assigned to the dialogues and/or any other suitable criteria for categorizing dialogues.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 2A illustrates one example of an array associated with the dialogues.

FIG. 2B illustrates one example of a user interface defined to convey a view of a dialogue.

FIG. 2C illustrates another example of a user interface defined to convey a view of a dialogue.

FIG. 7 is an exemplary illustration of a view of a dialogue provided to the user at a time instance T.

FIG. 7A is an exemplary illustration of an array associated with the dialogue shown in FIG. 7 at time instance T.

FIG. 8 is an exemplary illustration of a view of a dialogue provided to the user at a time instance T+1.

FIG. 8A is an exemplary illustration of an array associated with the dialogue shown in FIG. 8 at time instance T+1.

FIG. 19 illustrates another example of presenting a view of a dialogue provided at time T.

FIG. 20 is an exemplary illustration of a view of the dialogue shown in FIG. 19 at time T+1.

FIG. 21 is an exemplary illustration of a view of the dialogue shown in FIG. 19 at time T+2.

FIG. 22 is an exemplary illustration of a view of the dialogue shown in FIG. 19 at time T+3.

DETAILED DESCRIPTION

Figure 1:
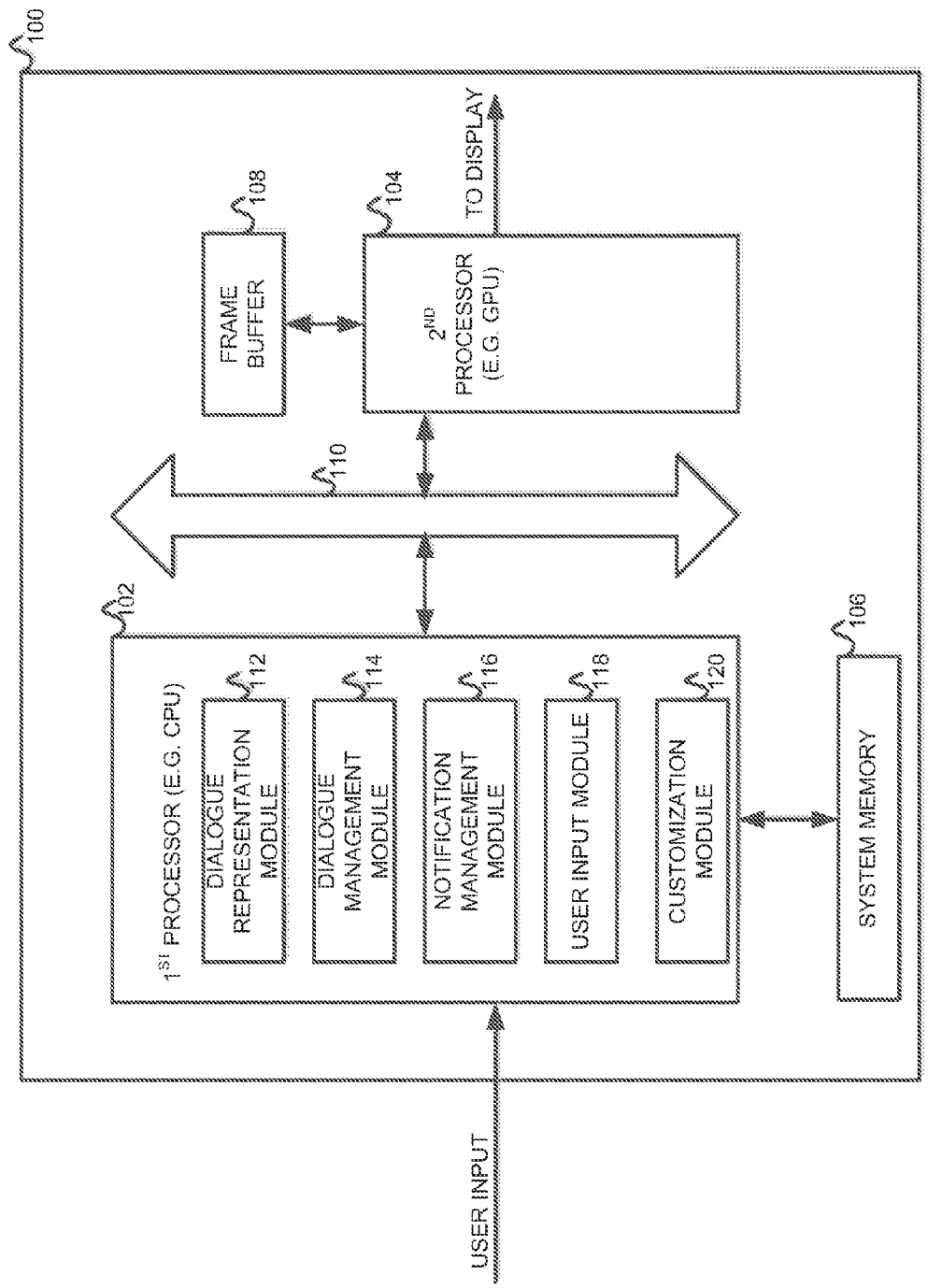
FIG. 1 one example of a system configured to present views of dialogues to a user.

FIG. 1 illustrates one example of a system 100 configured to present views of dialogues to a user. The system 100 may be any suitable device, for example, handheld device (e.g., mobile or smart phone, tablet, etc.), a laptop computer, desktop computer, media center, gaming console, set top box, printer or any other suitable device, to name a few. In this example, the system 100 employs a first processor 102 operatively connected to system memory 106 and a second processor 104 operatively connected to frame buffer 108. As shown in this example, the first and second processors may be connected using a data bus or point to point connections, such the system bus x, which transfers data between each structure of the system 100. Although not shown, the system 100 may also include an input device, such as but not limited to, mouse, trackball, touchpad, digitizing tablet, touchscreen, joystick, pointing stick, keypad, keyboard, camera, remote controller or any other suitable input device. The system 100 may also include a display, which is also not shown in this example. The display may include touch screen, liquid crystal display (LCD), light-emitting diode (LED) display, organic LED (OLED) displays, cathode ray tube (CRT) display, plasma display, projector screen, electroluminescent displays, vacuum fluorescent (VF) display, laser display, E-ink display or any other suitable displays, to name a few. The display may be configured to receive inputs from a user, for example a touch screen. One of ordinary skill in the art will recognize other suitable structure, such as but not limited to a storage device or a controller, camera, may also be included in the system 100.

In this example, the first processor 102 is a host central unit (CPU) having multiple cores however any suitable processor may be employed including a DSP, APU, GPGPU or any other suitable processor or logical circuitry. The CPU 102 may be bi-directionally connected to other components of the system 100 via the system bus as generally in known in the art. The second processor 104 may be a graphics processing unit (GPU), which drives the display device via a display connector, such as analog display connectors, for example, composite video, S-Video, VGA, digital display connectors, for example, HDMI, mini-DVI, micro-DVI, wireless connectors or any other suitable connectors. It is understood that, in some other examples of system 100, the first processor 102 (e.g., CPU 102) may be integrated with the second processor 104 to form a general processor. In addition, although the system memory 106 and the frame buffer 108 are shown in FIG. 1 as two separate components in the system 100, it is also understood that a unified memory architecture that can accommodate all the processors may also be employed in some other examples of the system 100.

In this example, as shown, the first processor 102 may employ a dialogue representation module 112, dialogue management module 114, notification management module 116, user input module 118, and customization module 120. The "module" referred to herein is any suitable executing software module, hardware, executing firmware or any suitable combination thereof that can perform the desired function, such as programmed processors, discrete logic, for example, state machine, to name a few. It is further understood that these modules may be included in the first processor 102 as part of the first processor 102, or a discrete component of the system 100 that can be executed by the first processor 102, such as software programs stored on computer readable storage medium that can be loaded into the system 100 and executed by the CPU 102. It is still understood that these modules may be combined in some other examples to form an integrated module that performs the combined functions of these modules as described herein. It is still understood the number of modules may vary in some other examples such that, for example, more than one dialogue management modules may be included in the first processor 102. These modules may communicate with structures in the system 100 such as but not limited to the system memory 106, the second processors 104 and the frame buffer 108 via any suitable communication link, such as the system bus 110.

Also shown in this example is the second processor 104, operatively connected to the frame buffer 108 via any suitable communication link. The second processor 104 in this example is a graphics processing unit (GPU) that may be configured to process graphics information for a display. The GPU 104 may be configured to receive graphics information from the first processor, e.g., from an output of the dialogue representation module 112. The GPU 104 may be configured to process graphics information to facilitate a presentation of the graphics information on the display. As shown, the GPU 104 may be connected to the frame buffer 108 for storing and retrieving information to facilitate the processing of graphics information.

Figure 2:
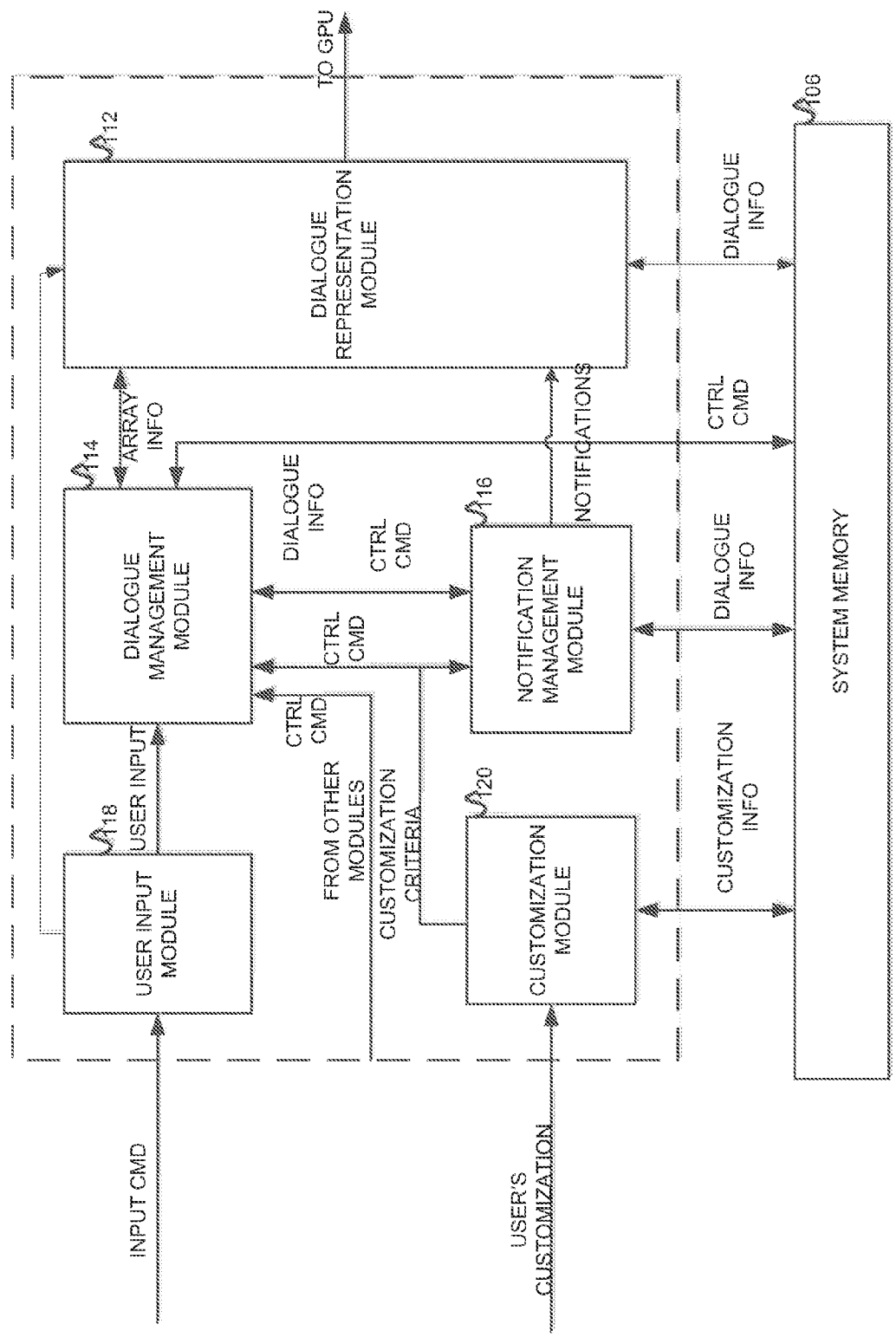
FIG. 2 illustrates further details of the system configured to present views of dialogues to a user as shown in FIG. 1.

FIG. 2 illustrates one example of system 100 as shown in FIG. 1. It will be described with reference to FIG. 1. As shown in this example, the first processor 102 is operatively connected to the system memory 106 via any suitable links such as the system bus 110. In this example, the first processor 102 employs a dialogue management module 114, dialogue representation module 112, notification management module 116, user input module 118 and customization module 120. As described above, the dialogue management module 114 may be configured to determine an array for a plurality of dialogues. The dialogue management module 114 may acquire information regarding the dialogues from the system memory 106. Such information may include time information regarding the dialogues, such as but not limited to, timestamps of messages received and/or sent in the dialogues, time zone where the dialogues take place, duration of the dialogues, and/or any other suitable time information. The information regarding dialogues may also include information describing the places the dialogues take place, the entities involved in the dialogues, keywords included in the dialogues, level of importance according to the user's definition, and/or any other suitable information regarding a dialogue.

The dialogue management module 114 may be further configured to determine an array for the dialogues based on the information regarding the dialogues. For example, upon receiving time information regarding one or more dialogues, the dialogue management module 114 may be configured to determine positions to be associated with the dialogues in an array based on timestamps of the dialogues. For instance, the dialogue with one or more of messages having timestamps later than the latest message in another dialogue may be assigned to an earlier position in the array than the another dialogue. However, as shown, the dialogue management module 114 may also be configured to receive criteria information from the customization module 120 for determining the array. For example, the user may choose an alphabetical order of the entities involved in the dialogues for determining the array. A first dialogue with an entity with earlier alphabets in its name may be determined to have an earlier position in the array than a second dialogue having an entity with alphabets in its name later than the first dialogue. Such customized information may be stored in the system memory 106 or may be acquired from the customization module 120.

FIG. 2A illustrates one example of an array determined by the dialogue management module 114 as shown in FIG. 2. As shown in this example, the array 202 may be stored on system memory 106, e.g., in a memory section. It is understood although the array 202 as shown is stored in a continuous memory section in this example, in some other examples the array may be stored in segmented memory locations and maintained through a, for example, a memory table. Also in some other examples, the array 202 may also be transcribed to a file and stored in any suitable storage medium, such as but not limited to, hard drives, cloud data store, optical medium, and/or any other suitable storage medium. As shown, the array 202 may comprise a number of individual members 204. The member 204, as shown, may be stored in a subset of the memory section that contains the array 202. As shown, the member 204 may comprise a position field 206 indicating a position assigned to the associated dialogue, an entity field 208 indicating the entities involved in the dialogue other than the user, a time information field 210 indicating such as the timestamp when the last communication received in the dialogue, and a status field 212 indicating, e.g., but not limited to, whether the user is actively engaging in the dialogue, whether a view of the dialogue is currently conveyed to the use on the display. As also shown in this example, the member 204 may also comprise notification field 214 to indicate whether notification has been generated for the dialogue and a dialogue filed 216 that may contain a memory address containing the actual content of the dialogue. It is also understood the actual dialogue may be replicated and stored in the dialogue field 216. One of ordinary skill in the art will appreciate the member 204 may also comprise any other suitable fields not shown in this example, such as but not limited to, a priority field indicating a level of importance the dialogue may be to the user based on predetermined criteria, a place field indicating where the dialogue takes pace and/or any other suitable field that may be used to describe a dialogue.

Refer back to FIG. 2. The dialogue management module 114 may be configured to receive a control command from, for example, the notification management module 116, the dialogue representation module 112 and/or any other modules in the system 100 to determine an array for one or more dialogues. In some examples, the array 202 may have been already created previously by the dialogue management module 114. In those examples, the determination may involve re-arranging positions of the array 202, adding the dialogues to the array 202 and/or removing the dialogues from the array 202. In some other examples, the array 202 may not exist yet and in those examples the dialogue management module 114 may also be configured to create the array 202 and assign positions of the array 202 to the dialogues.

The dialogue management module 114 may still be configured to assign positions or rearrange positions for the dialogues in the array 202 based on one or more criteria. For example, the positions may be assigned according to timestamps indicating the time when the last communication is received in the dialogue. The dialogue having a last communication with an earlier time stamp may be assigned to an earlier position in the array than the one with a last communication having a later timestamp. In another example, the positions may be assigned according to the entities involved in the dialogues. The dialogue having an entity whose name starts with earlier alphabets may be assigned to an earlier position than a dialogue having an entity whose name starts with later alphabets. The positions of the array 202 may also be rearranged if the information describing the dialogue has changed. For example, in the case where the positions are determined based on timestamps indicating communication last received, a first dialogue assigned to an earlier position in the array may be assigned to a later position if the first dialogue receives a new communication. In this manner, the positions of the array may be assigned dynamically to reflect the latest relationship among dialogues based on the criteria. In some other examples, the dialogues may not be reassigned to different positions once the positions are assigned to the dialogues. In those examples, new dialogues may be added to the array 202 by assigning unassigned positions to those dialogues.

The dialogue management module 114 may also be configured to remove dialogues in the array. For example, other modules such as the dialogue representation module 112 and/or the notification management module 116 may send control commands instructing the dialogue management module 114 to remove one or more dialogues from the array. In response to such control commands, the dialogue management module 114 may be configured to clear the memory section associated with those dialogues in the array. The clearing operation may be achieved by, for example, actually deleting the content of those memory sections, removing entries associated with those dialogues in a memory table, and/or any other suitable clearing operations. The dialogue management module 114 may be configured to rearrange the array 202 by assigning the positions associated with the deleted dialogues to other dialogues that are still associated with the array 202.

Also shown in this example is the notification management module 116. In this example, the notification management module 116 is operatively connected to the dialogue management module 114, the dialogue representation module 112, the customization module 120 and the system memory 106. The notification management module 116 may be configured to generate notifications for dialogues. As shown, the notification management module 116 may be configured to monitor information of the dialogues, for example, by accessing the system memory 106 and/or other modules such as the dialogue management module 114. Notifications may be generated based on one or more notification criteria and stored in the system memory 106 and/or directly communicated to other modules such as the dialogue representation module 112 and the dialogue management module 114. The notification criteria may include time information associated with the dialogues, level of importance associated with the dialogues, entities involved in the dialogues, keywords, and/or any other suitable criteria that may be used for generating notifications for dialogues. For example, based on the time information of dialogue monitored by the notification management module 116, the notification management module 116 may be configured to generate notifications for dialogues that have received a communication. In another example, a baseline level of importance may be set and notifications may be generated only for those dialogues having levels of importance higher than the baseline level importance.

The notification management module 116 may also be configured to determine a period of notification for the notified dialogues. For example, the notification period may be set to a few seconds or any suitable duration. Upon expiration of the notification period for a dialogue, the notification management module 116 may be configured to remove the notification for that dialogue, e.g., form the system memory 106 and/or send an update to other modules such as but not limited to the dialogue management module 114 and/or the dialogue representation module 112.

Still shown in this example is the customization module 120. As shown, the customization module 120 may be operatively connected to the dialogue management module 114, the notification management module 116, the system memory 106, and the dialogue representation module 112. The customization module 120 may be configured to provide an interface, such as but not limited to a settings interface, to enable the user to customize criteria that may be used by the dialogue management module 114, the dialogue representation module 112, and/or the notification management module 116 to facilitate their respective operations. For example, as shown, the user may provide customization for criteria by which the dialogue management module 114 may determine the array 202. For instance, the user may provide customization such that only certain dialogues between the user and entities of special interests to the user, such as but not limited to close friends, family members, inner circle, etc. may be included in the array 202. The user may also customize a baseline level of importance, e.g., a priority, such that the dialogue management module 114 may only include dialogues with dialogues having priorities higher than the baseline priority in the array 202. The user may also customize the criteria by which the dialogue management module 114 determines the array 202, e.g., but not limited to, time of communication last received, order of entities (e.g., a ranking of entities based on their importance to the user), order of keywords (e.g., a ranking of keywords based on their importance to the user) and/or any other suitable customization. Based on the customized criteria, the dialogue management module 114 may be configured to determine and assign positions of the array 202 to the dialogues.

The user may also customize notification criteria by which the notification management module 116 may be configured to generate notifications for the dialogues. As described above, one more criteria may be used to determine whether to notify about a communication received in a dialogue, such as the level of importance, keywords, entities involved, places where the dialogues take place, topics of the dialogues, and/or any other suitable criteria. The user may provide customization of one more criteria for the notification management module 116 to monitor the dialogues and generate the notifications.

The user may also customize how the dialogue representation module 112 may convey a view through a user interface. Details of dialogue views and the user interface conveying the views will be described later. The customization module 120 may be configured to store the user's customization information in the system memory 106 to facilitate other modules' access to the user's customization information. The customization module 120 may also communicate the user's customization information to other modules directly as instructed by the other modules via control commands.

Also shown in this example is the dialogue representation module 112. As shown in this example, the dialogue representation module 112 may be operatively connected to the dialogue management module 114, the notification management module, the user input module 118 and the system memory 106. The dialogue representation module 112, as shown in this example, may be configured to define a user interface that conveys a view of a dialogue to the user. FIG. 2B illustrates one example of a user interface 220 for conveying views of dialogues to the user. As shown in FIG. 2B, the user interface 220 may be defined to convey a view 221 for a dialogue. The user interface 220 may also include an input panel 226 that enables the user to input texts, links, HTML code, and/or any other suitable communication that may be used in a dialogue. The user interface 220 may also include e-motions, such as the e-motions 228 as shown in the example. The user interface 220 may still include a send button 230 as shown to allow the user to send input to the other entities in the dialogue. One of ordinary skill in the art will appreciate the user interface 220 may include any other suitable components to facilitate conveying views of dialogues. It is also understood although only one view of one dialogue is illustrated in FIG. 2B, the number of views that may be conveyed in the user interface 220 and as well the number of the dialogues that may be included in one view may vary in some other examples.

As shown in this example, the view 221 may include a title area 222 that conveys identifying information about the dialogue being included in the view 221. In this example, the name of an entity is shown in the title area 222, i.e. the name of the party the user is engaging with in the dialogue. In some other examples, the title area 222 may include the topic of the dialogue, the organization involved, a picture, time information, and/or any other suitable identifying information that may be included in a view of a dialogue. The view 221 may also include a dialogue content area 224 that conveys a content of the dialogue to the user. The user interface may be defined such that the content of the dialogue may be presented in different modes, such as but not limited to, field mode, linear mode, tree mode, and/or any other suitable displaying mode for presenting a content of a dialogue. In this example, the content of the dialogue is displayed in a field mode, wherein the user's communication with the other entity is displayed on the left side of the dialogue content area 224 and the communication from the other entity is displayed on the right side of the dialogue content area 224. It is understood although only one entity is illustrated in this example to be included in the dialogue, in some other examples more than one entities, such as multiple users, organizations, websites, and/or any other suitable entities may be included in the dialogue. The view of the dialogue may also include other information, such as but not limited to, the notifications, which will be described below.

Refer back to FIG. 2. As shown, the notification management module 116 may be configured to send control commands to the dialogue representation module 112 informing about the notifications generated. The dialogue representation module 112 may be configured to include the notifications in the view of the dialogue that is currently conveyed in the user interface 220. FIG. 2C illustrates one example of notifications being included in the view 221 of a dialogue. In this example, the dots 232 indicate notifications generated by the notification management module 116 notifying the user about other dialogues. As described above, the notification management module 116 may be configured to generate notifications about dialogues based on one or more notification criteria.

Refer back to FIG. 2. As shown, the dialogue representation module 112 may be configured to send control commands to instruct the dialogue management module 114 to determine positions for the array 202 which may be associated with the dialogues for which notifications were generated. In response to information regarding the notified dialogues, in this example, the dialogue management module 114 may be configured to assign positions to those dialogues in the array 202 as described above. For example, the dialogue management module 114 may be configured to assign positions to the notified dialogues based on the time stamps indicating times when the last communications are received in the dialogues—the dialogue with a later received communication may be assigned to a later position in the array 202 than the one having an earlier received communication. As described above, the dialogue management module 114 may be configured to determine the positions for the array based on other criteria.

As shown in this example, the user input module 118 may be operatively connected to the dialogue management module 114. The user input module 118 may be configured to determine a user input. As show, the user input module 118 may be configured to receive an input from the user. Such an input may include a finger swipe, mouse click, motion sensed by a motion sensor coupled to or included in the system 100, a voice command, and/or any other suitable input that may be used. For example, the user input module 118 may be configured to receive a finger swipe from the user and determine an orientation of the finger swipe, e.g., left to right, right to left, up to down, or down to up. Based on the orientation of the finger swipe, the user input module 118 may be configured to determine an offset. For instance, the user input module 118 may be configured to determine that the user finger swipe from left to right represents an offset of −1. The user input module 118 may be configured to send the offset to, e.g., the dialogue representation module 112 and/or the dialogue management module 114.

Figure 3:
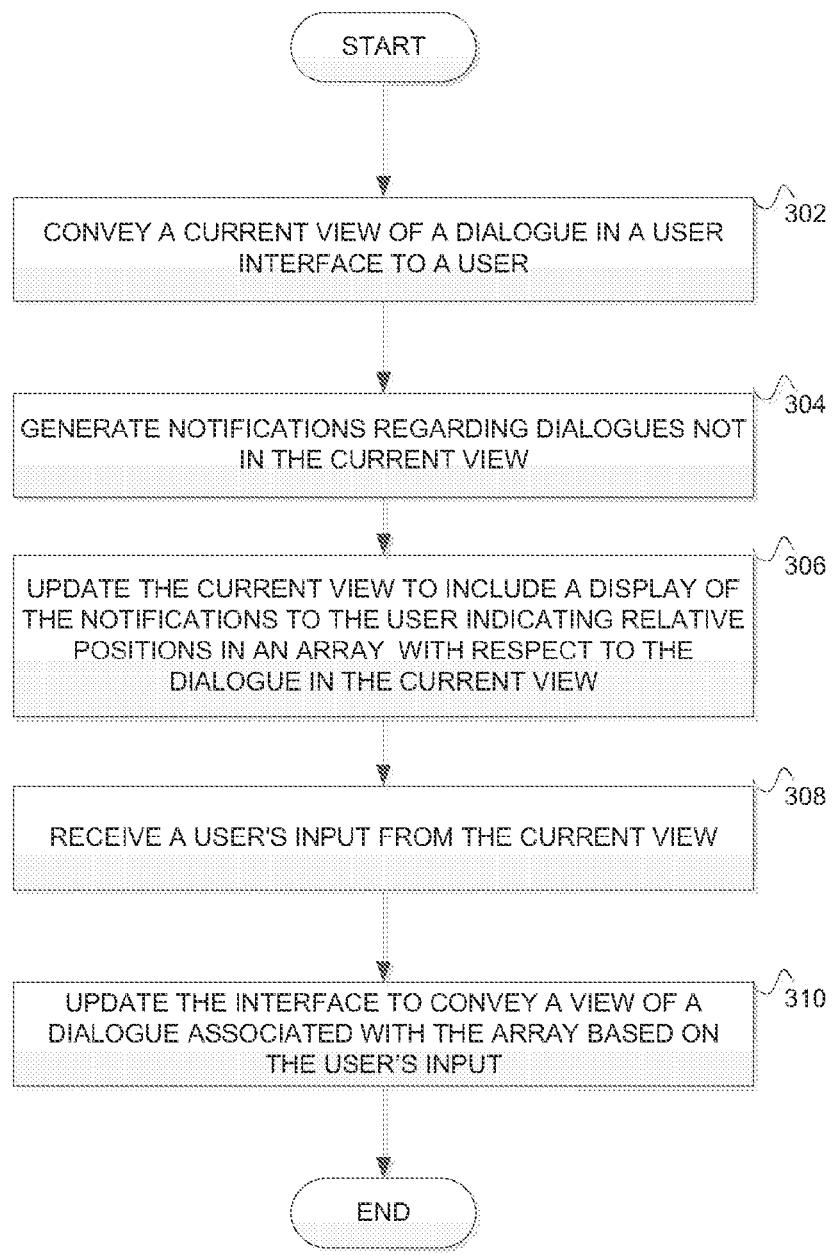
FIG. 3 illustrates one example of providing views of dialogues to the user.

FIG. 3 illustrates one example of presenting views of dialogues in accordance with the disclosure. It will be described with references to FIGS. 1-2. As shown, at block 302, in operation, the system and method may convey a current view of a dialogue in a user interface to a user. As described above, the dialogue representation module 112 may be configured to define a user interface, such as the user interface 220, to convey a view, such as the view 221 to present a dialogue to the user. The user may provide customization information to, e.g., the customization module 120, to customize how the view may present the dialogue as described above. At block 304, in operation, the system and method may generate notifications regarding dialogues not being presented in the current view. As described above, the notification management module 116 may be configured to generate notifications notifying the user of information regarding the dialogues not being currently presented in the view. At block 306, in operation, the system and method may update the current view to include a display of the notifications to the user indicating relative positions in an array, e.g., such as the array 202, with respect to the dialogue in the current view. As described above, the dialogue management module 114 may be configured to determine an array to be associated with the dialogues. Further details about operations described in block 306 will be illustrated in FIGS. 4-5. At block 308, the system and method may receive a user input from the current view. As described above, the user input module 118 may be configured to determine a user input received from the current view. Further details about operations described in block 308 will be illustrated in FIG. 6. At block 310, in operation, the system and method may update the interface to convey a view of a dialogue associated with array based on the user's input.

Figure 4:
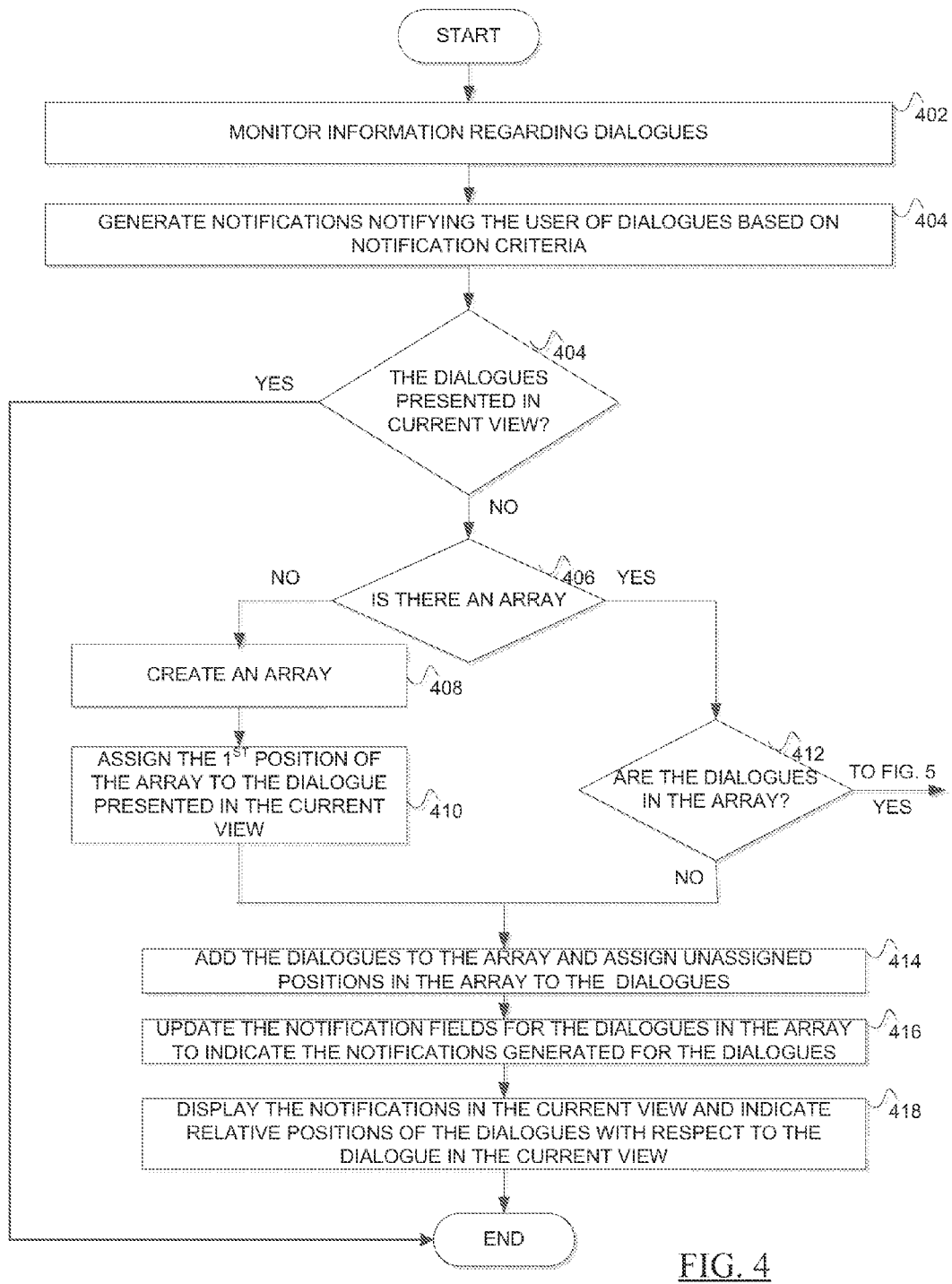
FIG. 4 illustrates another example of providing views of dialogues to the user.

FIG. 4 illustrates one example of updating the current view to include a display of the notifications to the user indicating relative positions in an array with respect to the dialogue in the current view, as described in block 306. It will be described with references to FIGS. 1-2. At block 402, in operation, the system and method may monitor information regarding one or more dialogues. For example, in some implementations, the notification management module 116 may be configured to periodically query information regarding the dialogues. The dialogue information to be queried may be determined by the notification criteria. For instance, in the case where the notification criteria is certain keywords, e.g., particular phrases, used in the dialogues, the notification management module 116 may be configured to query the content of the dialogues at a predetermined frequency to locate the particular phrases. This may be achieved by accessing an electronic storage, such as the system memory 106, where the dialogues may be stored, for example, by a dialogue receiving module (not shown) of the system 100 or any other suitable modules. In some other implementations, the dialogue information may also be monitored by pushing the information to the notification management module 116, for example, through a dialogue updating module (not shown) of the system 100 or any other suitable modules.

At block 404, in operation, the system and method may generate notifications notifying the user of the dialogues based on notification criteria. As described above, the notification criteria may be predetermined during the configuration stage of the system 100 and stored, for example, in the system memory 106. The notification criteria may also be customized by the user through a customization interface provided, for example, by the customization module 120. The notification criteria may include a reference, such as a point of time, a place, a level of importance as defined by the user, one or more entities, topics, keywords, and/or any other suitable reference that may be used to generate notifications for dialogues. As described above, the notification management module 116 may be configured to generate such notifications upon a determination that dialogues have met the notification criteria as set forth through the reference. For example, in the case where the notification criteria is "new messages from John, Tom, Ann, and Jen", notifications may be determined by examining the entities of the dialogues and whether there are new messages received in those dialogues in which the user engages with John, Tom, Ann, and/or Jen.

At decision block 404, in operation, the system and method may determine whether the dialogues for which the notifications were generated are being presented in a current view conveyed by the user interface. For example, the dialogue management module 114 may be configured to receive information about the dialogues for which the notifications were generated from the notification management module 116. The dialogue management module 112 may be configured to determine whether these dialogues are currently being presented in the current view, e.g., the view 221. In some implementations, the dialogue management module 114 may be configured to query the dialogue representation module 112 for such information. In some other implementations, the dialogue management module 114 may be configured to query the system memory 106, such as the system memory 106, for such information. In some cases, the dialogue management module 114 may recognize that the dialogues for which notifications were generated are being presented in the current view and proceeds to the end of the processing.

In some other cases, the dialogue management module 114 may recognize that the dialogues for which the notifications are generated are not being presented in the current view and proceeds to decision block 406. At decision block 406, the system and method may determine whether an array, such as the array 202 as described above, exists for the dialogues for which the notifications were generated. For example, the dialogue management module 114 may be configured to keep a record, e.g., in a table stored in the system memory 106, tracking whether an array exists for the dialogues. In some cases, the dialogue management module 114 may recognizes that the array does not exist and proceeds to block 408. At block 408, in operation, the system and method may, for example using the dialogue management module 114, create an array, such as the array 202, to be associated with the dialogues for which the notifications were generated. As described above, the array 202 may be stored in any suitable electronic storage, e.g., the system memory 106, included in or coupled to the system 100. In some implementations, the dialogue management module 114 may create the array 202 by pre-allocating continuous memory sections within the system memory 106. In some other implementation, segmented memory sections may be used in conjunction with a memory table to achieve the array 202. At block 410, in operation, the system and method may be configured to assign the first position of the newly created array, e.g., the array 202, to the dialogue being presented in the current view. This may facilitate an indication of relative positions of the dialogues for which notifications were generated with respect to the dialogue being presented in the current view.

Refer back to decision block 406. In some cases, the decision block 406, in operation, may recognize that an array, e.g., the array 202, exist for the dialogues for which notifications were generated. In those cases, the processing proceeds to decision block 412. At decision block 412, the system and method may determine whether the dialogues for which notification were generated are already in the array, for example the array 202. In some cases, as shown, the system and method, for example through a determination made by the dialogue management module 114, recognizes that the array, e.g., the array 202 are not yet associated with the dialogues for which the notifications were generated. In those cases, the processing proceeds to block 414.

At block 414, in operation, the system and method may add the dialogues for which notifications were generated to the array, e.g., the array 202, and assign unassigned positions in the array to those dialogues. For example, in the case where the dialogue management module 114 created the array 202 using pre-allocated continuous memory sections within the system memory 106, the dialogue management module 114 may be configured to assign unassigned (or unoccupied) memory sections within the array 202 to those dialogues. In some examples, such unassigned positions may be trailing the previously assigned positions. In some other examples, such unassigned positions may be the positions that have been previously assigned to dialogues not associated with the array 202 anymore.

At block 416, in operation, the system and method may update the notification fields, e.g., the notification field 214 for the dialogues for which notifications were generated to indicate such notifications. At block 418, in operation, the system and method may display the notifications in the current view and indicate relative positions of the dialogues with respect to the dialogue in the current view. For example, the notification management module 116 may be configured to instruct the dialogue representation module 112 to update the current view to display the notifications. In response such instructions, the dialogue representation module 112 may display, for example, shaded, colored dots, pictures of entities, texts and/or any other suitable visual indications that may be used to notify the user of the dialogues for which notifications were generated, The dialogue representation module 112 may be configured to acquire information about relative positions of those dialogues with respect to the dialogue being presented in the current view and convey that information in the current view. Further details about display of such relative positions in various examples will be illustrated in FIGS. 7-25.

Figure 5:
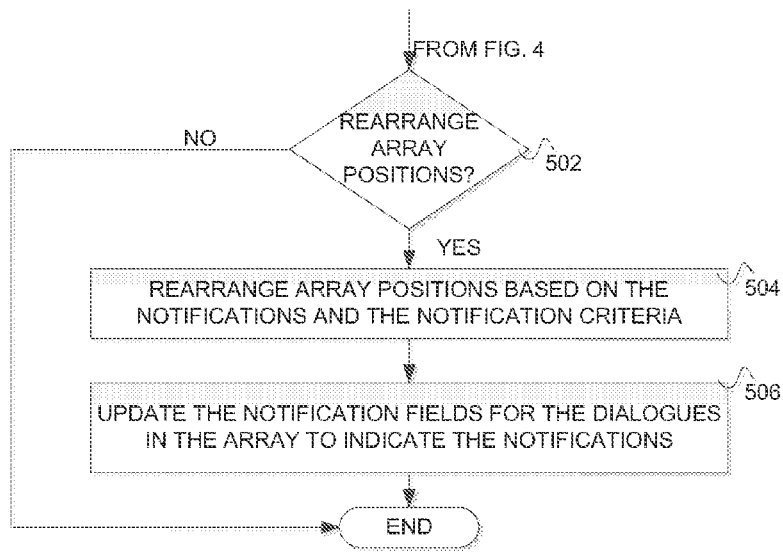
FIG. 5 illustrates still another example of providing views of dialogues to the user.

Refer back to decision block 412. In some cases, at decision block 402, in operation, the system and method may recognize that the dialogues for which the notification were generated are already associated with the array. In those cases, the processing proceeds to FIG. 5. Refer to FIG. 5. At decision block 502, in operation, the system and method may determine whether the positions in the array are to be re-arranged. As described above, in some implementations, the dialogue management module 114 may be configured to re-arrange the positions of the array 202 based on the notification criteria. For example, in the case where the notification criteria is level of importance associated with the dialogues, the dialogue management module 114 may be configured to re-arrange the positions of the array 202 such that the dialogues with higher level of importance are assigned to earlier positions in the array 202 than those having lower level of importance. As shown, in some cases, the system and method may recognize that the positions may not be reassigned, for example, as customized by the user through the customization module 120. In those cases, the processing proceeds to the end.

In some other cases, the system and method may recognize that the positions of the array are to be re-arranged to comply with the criteria used to determine the positions of the array. In those cases, the processing proceeds to block 504. At block 504, in operation, the system and method may rearrange the positions of the array based on the notifications and notification criteria. As described above, this may involve reassigning the positions of the array to dialogues to reflect the latest state of the dialogues. For example, in the case where the notification criteria are keywords, the dialogues having critical keywords in the most recent messages may be moved to the earlier positions in the array from its original positions which were assigned to the dialogues when they did not contain those critical keywords in the messages. At block 506, in operation, the system and method may update the notification fields, e.g., the notification fields 214, for the dialogues for which the notifications were generated to indicate notifications were generated for the dialogues.

Figure 6:
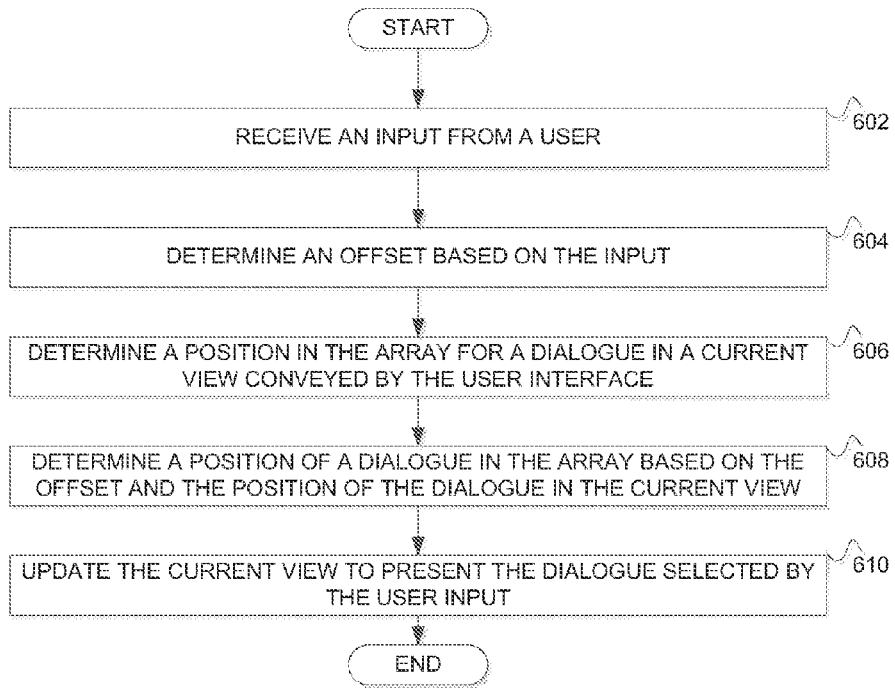
FIG. 6 illustrates yet another example of providing views of dialogues to the user.

FIG. 6 illustrates one example of displaying the notifications in the current view and indicate relative positions of the dialogues with respect to the dialogue in the current view, as described in block 416 of FIG. 4. It will be described with references to FIGS. 1-3. At block 602, in operation, the system and method may receive an input from a user. As described above, the user may provide an input through an input device such as touch screen, mouse, track ball, motion sensor, camera, voice recognition and/or any other suitable input means. At block 604, in operation, the system and method may determine an offset based on the input received. For example, the user input module 118 may be configured to determine an orientation of the input, e.g., starting at left and ending at right, starting at right and ending at left, etc., to determine an offset, e.g., −2, −1, +1, +2 and etc. In some implementations, the user input module 118 may be configured to interpret a user's finger swipe from left to right received through the touch screen as an offset −1. Conversely, the input module x, in those implementations, may be configured to interpret the user's finger swipe from right to left as an offset +1.

At block 606, the system and method may determine a position in an array of dialogues based on the offset and the array position of the dialogue in the current view. For example, in response to the offset determined by the user input module 118, the dialogue representation module 112 may be configured to receive the offset and update the current view. At block 606, in operation, the system and method may determine a position in the array assigned to the dialogue in the current view. For example, the dialogue representation module 112 may be configured to acquire information regarding the dialogue in the current view from the dialogue management module 114 and/or the system memory 106. Such information may include a field, e.g., the status field 212 that indicates the dialogue is being presented in the current view, e.g., the view 221, through the user interface, e.g., the user interface 220. At block 608, in operation, the system and method may determine a position in the array based on the offset and the position of the dialogue being presented in the current view. For example, the dialogue management module 114 may be configured to determine the dialogue indicated by the user's input, e.g., a finger swipe, offsets the dialogue in the current view by a number of positions based on the user input. For instance, when the array position of the dialogue in the current view indicates 3, the dialogue representation module 112 may be configured to determine a user finger swipe from right to left means an offset +1, which means that the user's input selects the dialogue assigned to position 4 of the array.

At block 610, in operation, the system and method may update the current view to present the dialogue selected by the user input. For example, the dialogue representation module 112 may be configured to acquire content and/or other suitable information of the dialogue selected by the user's input. Such information may be acquired from the dialogue management module 114 and/or from the system memory 106. With such information, the dialogue representation module 112 may be configured to update the user interface, e.g., the user interface 220, to present the dialogue selected by the user's input in a view.

FIGS. 7-25 illustrate various examples for presenting views of dialogues to a user in accordance with the disclosure. They will be described with references to FIGS. 1-3. FIGS. 7-12 illustrate one use case for presenting views of dialogues to a user whereby the notifications are generated based on timestamps of messages received in the dialogues and are displayed dynamically in a view of a dialogue. FIG. 7 illustrates that at time T, the user is engaging in a dialogue with an entity named John. As shown, the user interface 220 may be defined, e.g., by the dialogue representation module 112 to convey a view 221 to present the dialogue between the user and John. Also as shown, the title area 222 in the view 221 may be configured to display the name of the entity, e.g., John in this case and as well as notifications and relative positions of notified dialogues with respect to the dialogue in the current view as described above. In this example, also at time T, a notification is generated for a dialogue by, e.g., the notification management module 116. As shown, to notify the user of the notifications, a darkened dot 704 may be displayed in title area 222. Also as shown, to inform the user of the relative position in an array with respect to the dialogue in the current view 222, e.g., the dialogue with John, a shaded dot 702 is displayed to the left of the darkened dot 704. In this example, the shaded dot 702 may be used to indicate the current dialogue, i.e. the dialogue with John at time T. As also shown, an indication arrow 710 pointing to the right may be displayed in the dialogue content area 224 of the view 221 to indicate that the user may provide an input, such as a swipe from right to left, to have the current view present the dialogue for which the darkened dot 704 is associated with.

FIG. 7A illustrates an array 202 associated with the dialogues at time T. The array 202 may be created, e.g., by the dialogue management module 114 and may be associated with the dialogues described in FIG. 7. As shown in this example, the array 202 may be created and stored in the system memory 106. At time T, as shown, the array 202 have two members 204, which are illustrated in further details in the bottom portion of FIG. 7A. As shown, the first member 204 of the array 202 may comprise a position field 206, which is populated with a value of "1" in this example. One of ordinary skill in the art will appreciate that any suitable value such as but not limited alpha numerals, texts, roman numerals, etc. may be used to populate the position filed 206. As also shown, the first member 204 may comprise an entity field 208, which may be used to populate any suitable information describing the dialogue. In this example, the first member 204, i.e., the first position of the array 202, is assigned to the dialogue being presented in the current view 221, i.e., the dialogue between the user and John as shown in FIG. 7. Accordingly, the entity filed of the first member 204, in this example, is populated with the name John. One of ordinary skill in the art will recognize any suitable information identifying entity or entities involved in the dialogue may be used to populate the entity field 208.

Also shown is a time field 210 as described above. The time field 210 may be used to record time information regarding the dialogue associated with the array 202. In this example, the time filed 210 is used to record information regarding the last communication, e.g., a message, received from the entity engaging with the user in the dialogue. As shown, the time field 210 of the first member 204 may be populated with a time stamp showing that the last message receive from John was at the $31^{st}$ seconds of 19:43 pm on May 3rd of 2012. Still shown in this example is a status field 212 for the first member 204. As shown in FIG. 7, at time T, the current view presents the dialogue with John to the user and the status field may thus be populated, in this example, with "ACTIVE" indicating that the dialogue associated with the first member 204, i.e., the dialogue between the user and John, is currently being presented in the view 221. Still shown is a notification field 214 for the first member 204. As described above, the notification filed 214 may be used to indicate whether there is a notification generated for the dialogue associated. In this example, since there is no notification generated for the dialogue with John at time T, the notification field 214 of the first member 204 is populated with a value of "NO" to indicate there are no notifications generated for this dialogue. Yet shown in this dialogue is the content field 216. In this example, the content filed is configured to contain memory addresses where the actual content of the dialogue is stored, e.g., the messages as shown in dialogue content area 224 in FIG. 7.

Similarly shown in FIG. 7A is the constituent fields in the second member 204 of the array 202. As shown, the entity field 208 of the second member 204 is populated with Jen to indicate the dialogue associated with the second member 204, i.e. the second position of the array 202 is the dialogue between the user and Jen. As indicated by the time field 210, one or more messages are received from Jen in the dialogue between the user and Jen at the $48^{th}$ seconds of 19:42 pm on May $3^{rd}$ of 2012. Since this dialogue is not being presented in the current view 221, the status field 212 of the second member 214 is populated with the value of "NON-ACT" to indicate that the dialogue with Jen is not being presented to the user in the current view 221. However, since a notification was generated for the dialogue, the notification status filed 214 of the second member 204 is populated with the value "YES" to indicate that there are notifications generated for the dialogue associated with the second position of the array 202, i.e. the dialogue between the user and Jen.

Refer back to FIG. 7. In some implementations, the dialogue representation module 112 may be configured to use the information shown in FIG. 7A to define and/or update the user interface 220 and/or the view 221. In this example, the dialogue representation module 112 may be configured to use the position fields, status fields and the notification fields of the first member and second member 204 to determine a display of the notification to the user. For instance, the dialogue representation module 112 may be configured to display two dots, as shown, i.e. 702 and 704 to indicate relative positions between the dialogue with John, i.e., the dialogue being currently presented in the view 221, and the dialogue with Jen for which a notification was generated. As shown, such a relative position relationship between the two dialogues may be reflected through a sequential arrangement of dots and an indication of where the current dialogue is. The dialogue representation module 112, in this example, may be configured to shade the dot 702 based on the position, status, and notification information associated with the dialogue, e.g., the dialogue between the user and John. Similarly, the dialogue representation module 112 may be configured to use like information for the second member 204, i.e., the second position of the array associated with the dialogue between the user and Jen, to determine to darken the dot 704 notifying the user there is an notification.

FIG. 8 illustrates an example of user interface 220 conveying a view of 221 at time T+1. As shown, at time T+1 the view 221 presents the dialogue between the user and Jen. As described above, such an update of view 221 may be achieved by receiving a user input indicating an offset. For example, the view 221 being presented to the user at T as illustrated in FIG. 7 may give user indications how to instruct an update of the view to present a dialogue for which the notification was generated, e.g., the dialogue between the user and Jen. Such an indication may be given through the sequencing and presentation of the notifications with respect to the dialogue in the current dialogue, e.g. shaded dot 702 representing the current dialogue with John followed by the darkened dot 704 representing a notification generated for the dialogue with Jen. Such an indication may also be given through, for example, the indication arrow 710 indicating to the user that an input in the right-to-left direction, e.g., a finger swipe, will update the view 221 to present the dialogue for which the notification was generated. In response to such an indication, the user may be enabled to provide a user input, such as a finger swipe from right to left, to achieve a horizontal scrolling such that the view 221 will present the dialogue for which the notification was generated. As described above, such a user input may be received and interpreted by the user input module 118 for a determination of an offset. In this example, a finger swipe from right-to-left may be determined as an offset +1. Based on this offset, the dialogue representation x determines an update for the view 221 to present the dialogue offsetting the current dialogue in the array 202 by +1, which is the dialogue associated with the second member 204—i.e., the dialogue between the user and Jen.

As shown in FIG. 8, at time T+1, the dialogue with Jen is presented in the view 221. Accordingly, the dialogue management module 114 may be configured to update the status field 212 of the first member 204, i.e., the one associated with the dialogue with John, from ACTIVE to NON-ACT to indicate the dialogue with John is not being presented in the current view, e.g., the view 221. However, in some other examples, the dialogue with John may still be presented in the view 221 along with the dialogue with Jen and the status filed 212 of the dialogue with John may not be updated. In any case, since the view 221 is presenting the dialogue with Jen, the dialogue management module 114 may also be configured to update the status filed 212 of the second member 204 to "ACTIVE" indicating that the dialogue with Jen is now being presented in the view 221. As also shown in FIG. 8, the dialogue representation module 112 may be configured to update the view 221 to reflect that the dialogue with Jen is the current dialogue through shading the dot 704. Similarly the dot 702 may be filled with no color to indicate the dialogue with John is no longer presented in the view 221 and does not have a notification associated with it but remains in the position to the immediate left of the position associated with the dialogue with Jen in the array 202.

Still shown in FIG. 8 is a third dot 706 corresponding to the $3^{rd}$ member 204 of the array (not shown in FIG. 7A) illustrated in FIG. 8A. As shown, the dot 706 may be displayed at time T+1 to indicate a notification was generated for another dialogue different from the dialogues with John and Jen. FIG. 8A shows the third member 204 is associated with a dialogue between the user and entity named Tom as indicated by the entity field 208 of the $3^{rd}$ member 204. The time field 210 of the third member 204 indicates that a message was received from Tom at the $22^{nd}$ seconds of 19:43 on May 3rd of 2012, which was later than the time when last messages receive from Jen and John as indicated in their respective time fields of the associated members 204 in the array, e.g., the first and second members 204. The notification field 214 of the third member 204 is populated that there is a notification associated with the dialogue with Tom. Accordingly, the dialogue representation module 112 may be configured to update the view 221 to darken the dot 706 notifying the user there is another dialogue that just received a new message. The indication arrow 710 may also be displayed in the view 221, as shown, to indicate to the user that a user input in the direction from right to left may update the view 221 to present the dialogue for which the notification indicated by the darkened dot 706 was generated.

Figure 9:
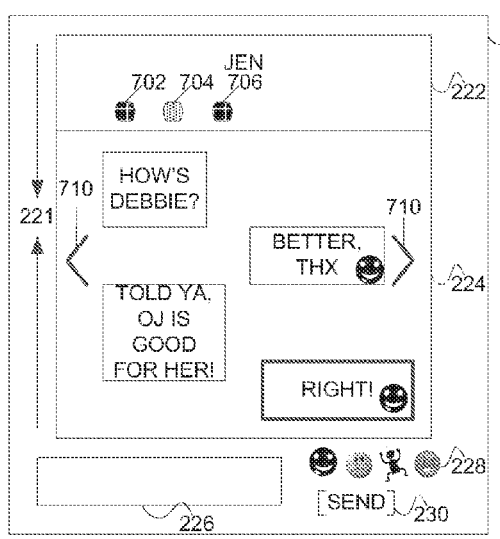
FIG. 9 is an exemplary illustration of a view of a dialogue provided to the user at a time instance T+2.
Figure 9A:
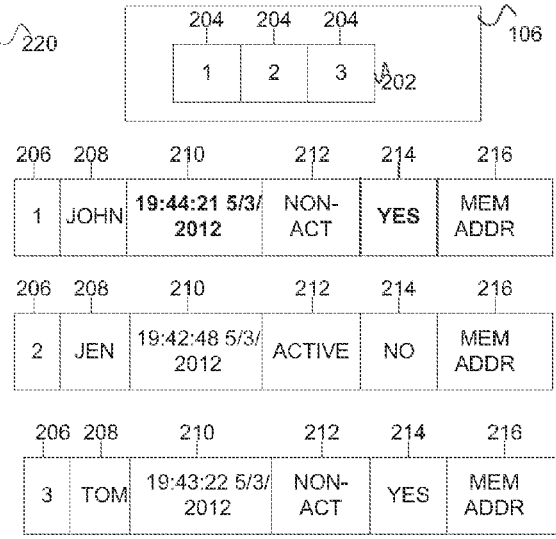
FIG. 9A is an exemplary illustration of an array associated with the dialogue shown in FIG. 9 at time instance T+2.

FIG. 9 illustrates one example of presenting a view of a dialogue at time T+2. As shown, the view 221 still displays the dialogue with Jen to the user and the user is engaging with Jen by sending her a message in response to the last message received from Jen. As a result, the user has not provided a user input between time T+1 and time T+2 instructing an update of view 221 to present a different dialogue. Accordingly, the notification for the dialogue with Tom, also shown in FIG. 8, still remains in the view 221. However, at time T+2, a new notification was generated as indicated by the darkened dot 702. Because of the relative positions among dots 702, 704, and 706 and their corresponding positions in the array 202, the darkened dots 702 may be used to notify the user that the dialogue associated with position 1 of the array 202, i.e., the dialogue with John has received a new message from John. Accordingly as shown in FIG. 9A, the time filed 210 and notification field 214 of the first member 204 that is associated with the dialogue with John has been updated to reflect a new message and notification was received for the dialogue with John. As shown in FIG. 9, the dialogue representation module 112 may be configured to use the updated information of the first member 204 to darken the dot 702 notifying the user that there is a notification generated for the dialogue with John. As also shown, an indication arrow 710 may be displayed on the left side of the view 221 for an indication to the user such that a user's input in the direction from left to right may update the view 221 to present the dialogue which the darkened dot 702 is associated with, i.e., the dialogue with John.

Figure 10:
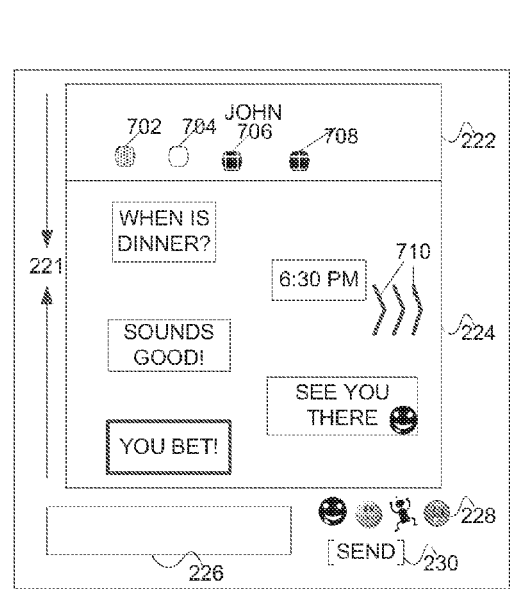
FIG. 10 is an exemplary illustration of a view of a dialogue provided to the user at a time instance T+3.

FIG. 10 illustrates an example of presenting a view of a dialogue at time T+3 in accordance with the disclosure. In this example, the user may provide an input, such as a finger swipe from left to right, between the time T+2 and time T+3. As described above, in response to the user input, the dialogue representation module 112 may be configured to update the view 221 to present the dialogue offsetting the current dialogue at time T+2, i.e. the dialogue with Jen, by a −1 in the array 202—that is the dialogue with John. As a result, the view 221 is updated to present the dialogue with John at time T+3 as shown and the dot 702, corresponding to the first position of the array 202, is shaded to reflect that the dialogue being presented is associated with the first position of the array 202. As also shown in FIG. 10A, the status field 212 of the first member 204 may be updated to reflect that the view 221 is presenting the dialogue with John.

Figure 10A:
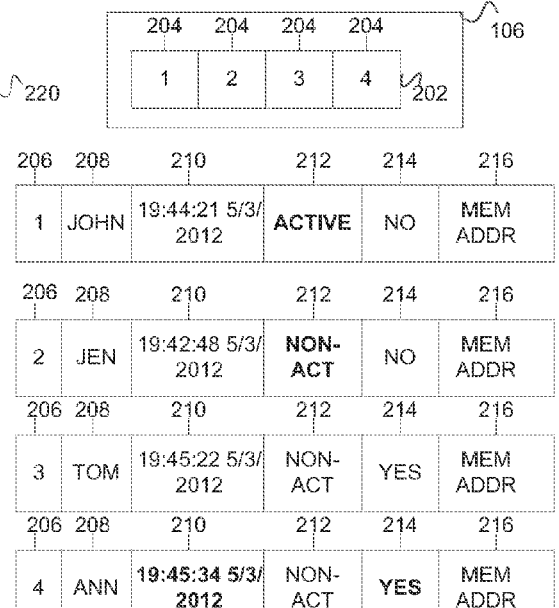
FIG. 10A is an exemplary illustration of an array associated with the dialogue shown in FIG. 10 at time instance T+3.

As also shown in FIG. 10A, at time T+3, the status field 212 of the second member 214 that is associated with the dialogue with Jen may be updated to reflect that the dialogue with Jen is not being presented in the view 221. Accordingly, the dot 704, as shown in FIG. 10, may be filled with no color to indicate the dialogue with Jen is not presented in the view 221 and there is no notification for it. At time T+3, since the dialogue with Tom has not been presented to the user in the view 221 after a notification, as indicated by the darkened dot 706, was generated, the notification remains in the view 221. As still shown in FIG. 10, a darkened dot 708 is also added to the immediate right of dot 706 at time T+3 notifying that another dialogue has received a message different from the dialogues with John, Jen and Tom. As shown in FIG. 10A, the fourth member 214 may be added to the array 204, for example, by the dialogue management module 114. As shown, the entity field 208 may be populated to indicate the dialogue is between the user and an entity named Ann. The message was received at $34^{th}$ seconds of 19:45 pm on May $3^{rd}$ of 2012, as indicated by the time field 210 of the $4^{th}$ member 204. The notification field 214 may be populated to indicate there is a new notification generated for this dialogue, i.e. the dialogue with Ann. As shown in FIG. 10, three indication arrows 710 may be displayed indicating to the user more than one user inputs may be needed to scroll to the dialogues for which notifications were generated and displayed, i.e. the dialogue with Tom and the dialogue with Ann.

Figure 11:
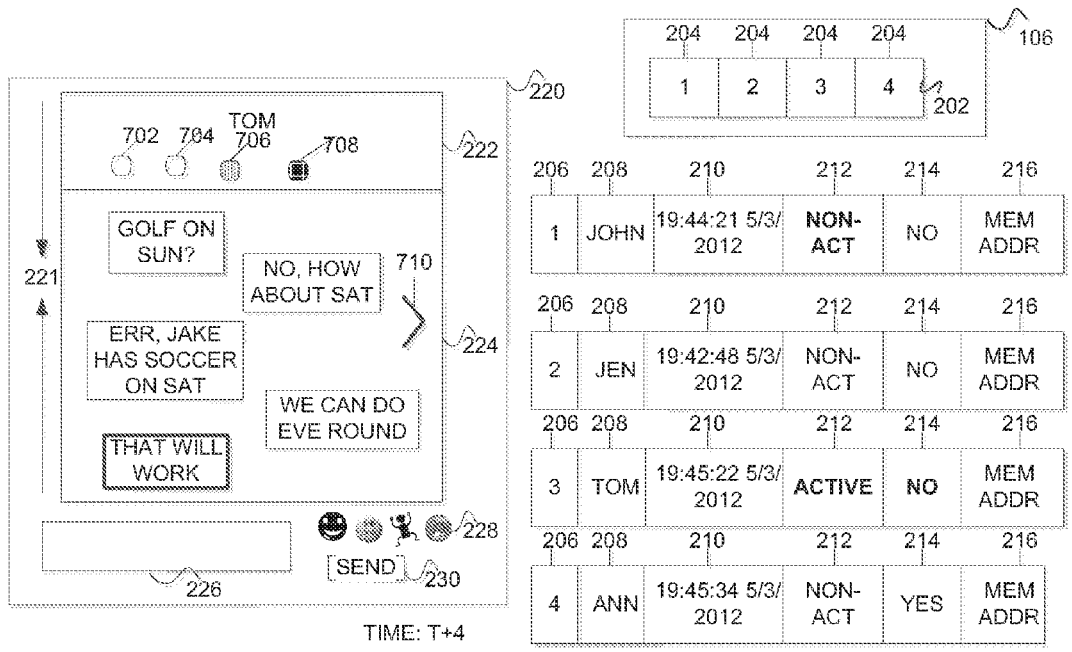
FIG. 11 is an exemplary illustration a dialogue and an array associated with the dialogue at time instance T+4.
Figure 12:
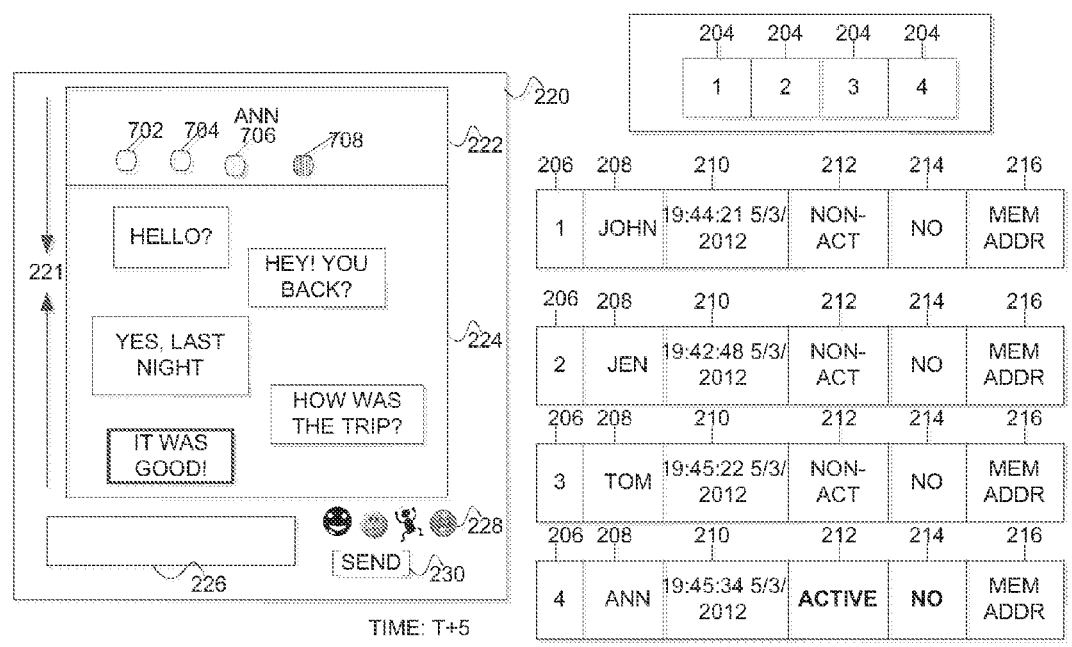
FIG. 12 is an exemplary illustration of a dialogue and an array associated with the dialogue at time instance T+5.

FIG. 11 and FIG. 12 illustrate examples of presenting views of dialogues to the user at times T+4 and T+5. As shown in FIG. 11, in response to the user input to scroll the dialogues to be presented in the view 221, the dialogue representation module 112 may be configured to update the view 221 to present dialogue with Tom, which is associated with the $3^{rd}$ member 204 of the array 202, and update the dots 702-706 to reflect the notification status of the dialogues associated with them. In addition, the indication arrow 710 may also be updated according to the relative positions among the dialogues in the array 202. As shown in FIG. 12, at time T+5, in response to the user's input, the dialogue representation module 112 may be configured to update the view 221 to present dialogue with Ann.

Figure 13:
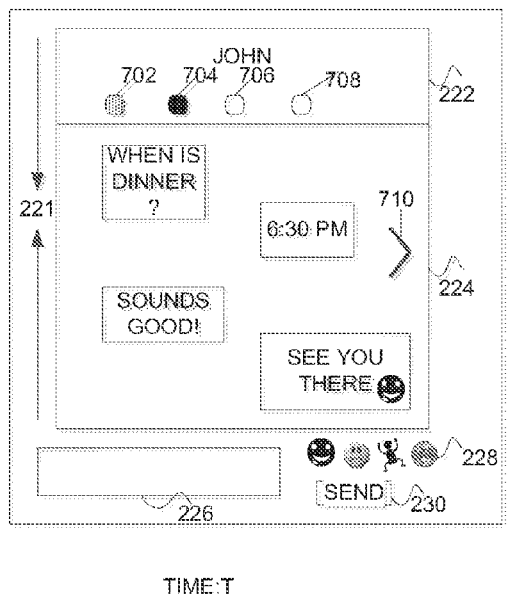
FIG. 13 is another exemplary illustration of a view of a dialogue provide to the user at a time instance T.
Figure 13A:
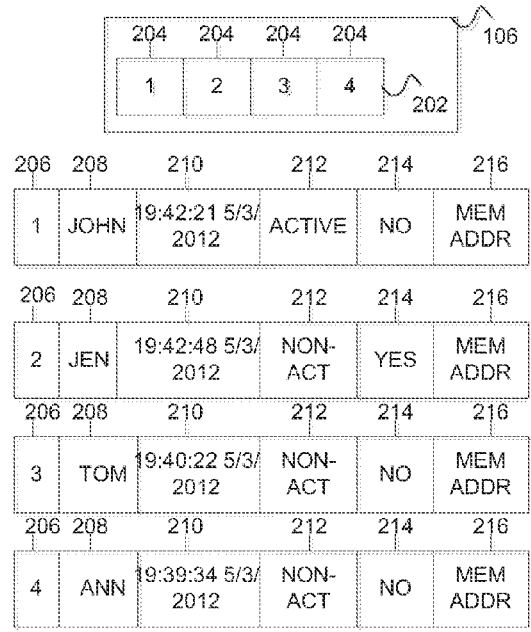
FIG. 13A is an exemplary illustration of an array associated with the dialogue shown in FIG. 13 at time instance T.
Figure 14:
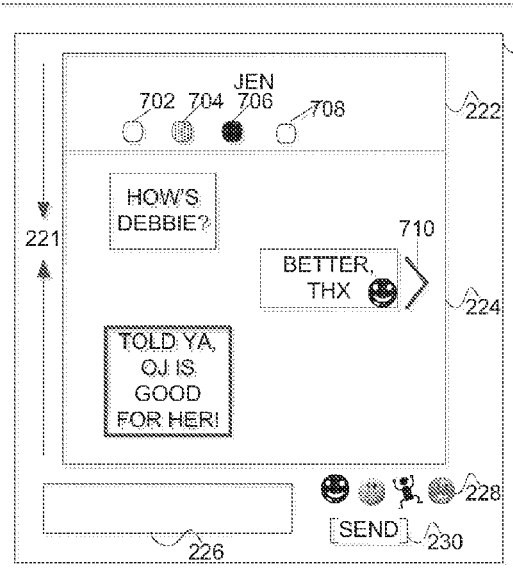
FIG. 14 is an exemplary illustration of a view of the dialogue shown in FIG. 13 at time T+2.
Figure 15:
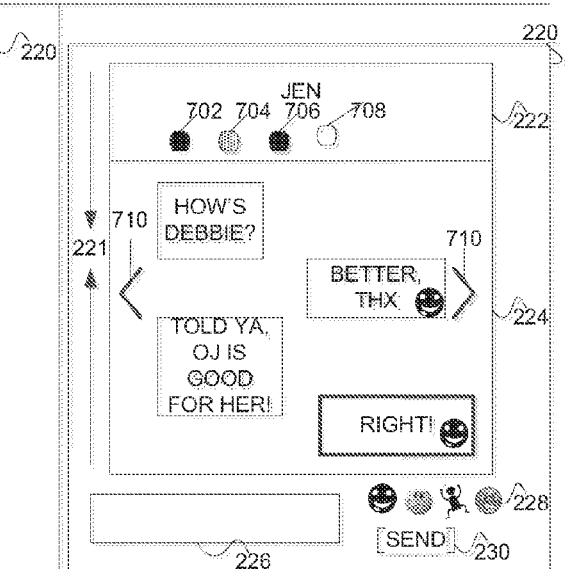
FIG. 15 is an exemplary illustration of a view of the dialogue shown in FIG. 13 at time T+2.
Figure 16:
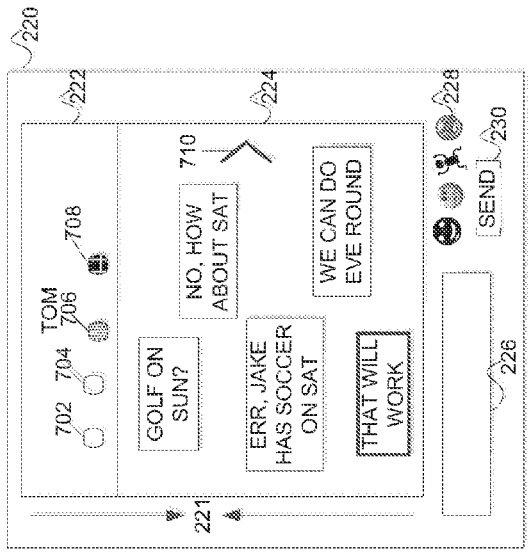
FIG. 16 is an exemplary illustration of a view of the dialogue shown in FIG. 13 at time T+3.
Figure 17:
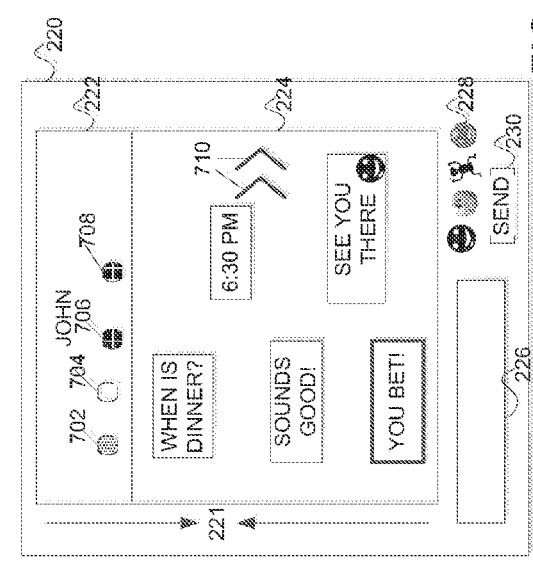
FIG. 17 is an exemplary illustration of a view of the dialogue shown in FIG. 13 at time T+4.
Figure 18:
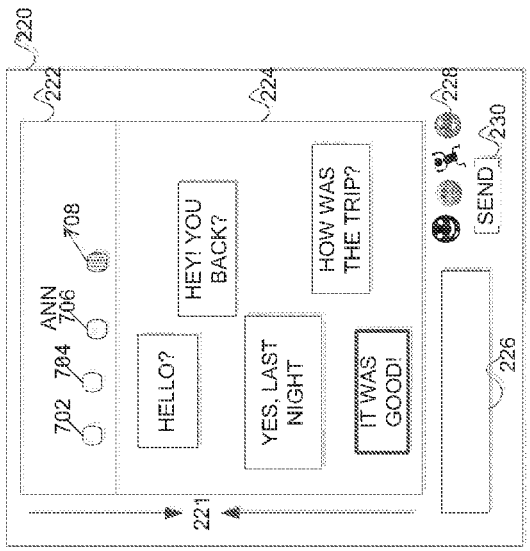
FIG. 18 is an exemplary illustration of a view of the dialogue shown in FIG. 13 at time T+5

FIGS. 13-18 illustrate another use case wherein the messages receiving sequences are identical to those of the use case illustrated in FIGS. 7-12. However, in this use case, unlike the use case illustrated in FIGS. 7-12, the array 202 may be already pre-allocated by, for example, the dialogue management module 114. For example, the user may provide customization through the customization module 120, e.g.,
setting a group of users, inner circle, family members, favorite contacts, etc. with whom the user would like to engage in dialogue with in a period of time. As shown in FIG. 13, at time T, dots 702-708 are all displayed in the view 221. The dots 702-708 in this example are associated with the members of array 202 as shown in FIG. 13A. That is, dot 702 is associate with first member 204, which is associated with the dialogue with John; dot 704 is associated with second member 204, which is associated with the dialogue with Jen; dot 706 is associated with third member 204, which is associated with the dialogue with Tom; and dot 708 is associated with fourth member 204, which is associated with the dialogue with Ann. In some implementations, such associations may be established by the user, e.g., through customization module 120, during a configuration stage of system 100.

At different times, shown in FIGS. 13-18, the dots 702-708 and indication arrows may be updated to reflect the current dialogue, relative positions, notifications and indications to the user. The view behavior and corresponding user input as illustrated in these FIGs are similar to that illustrated in FIGS. 7-12. However, unlike the examples shown FIGS. 7-12, in these FIGs notifications are only generated for the four members 204 in the array 202 and the array 202 may not grow dynamically to add new members associated with other dialogues not already associated the array 202. This may provide the user convenience for focusing only on the dialogues the user wishes to pay attention to and filtering out the dialogues that user does not wish to view in a period of time.

Figure 23:
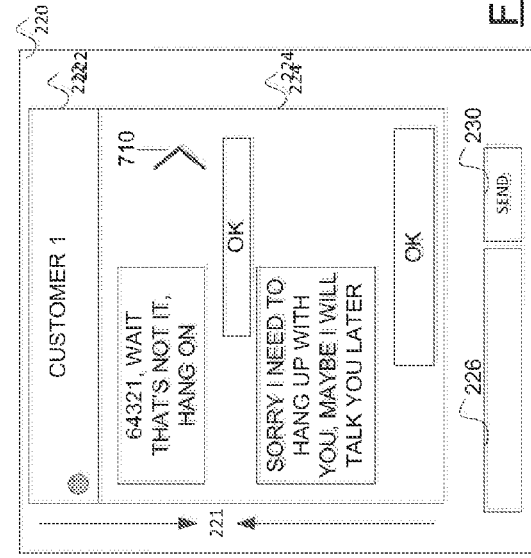
FIG. 23 is an exemplary illustration of a view of the dialogue shown in FIG. 19 at time T+4.
Figure 24:
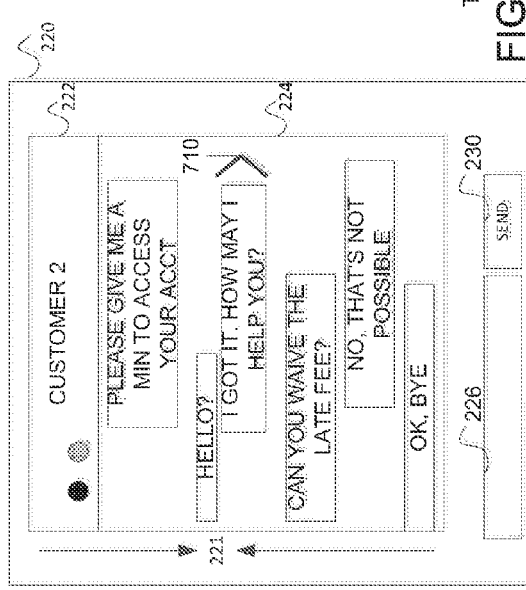
FIG. 24 is an exemplary illustration of a view of the dialogue shown in FIG. 19 at time T+5.
Figure 25:
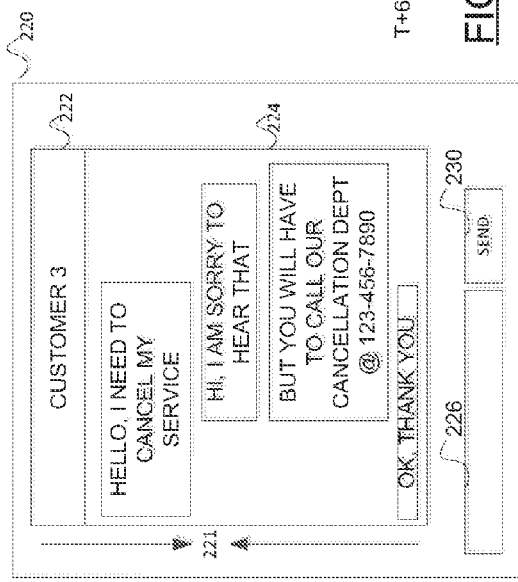
FIG. 25 is an exemplary illustration of a view of the dialogue shown in FIG. 19 at time T+6.

FIGS. 19-25 illustrate yet another use case wherein the notifications and the array may be re-arranged and/or determined dynamically. In this case, the dialogues may be between a customer care specialist of an organization, e.g., a telecommunication service provider as shown, and the customers of the organization. As shown in FIG. 19, the customer care specialist, at time T, may be engaging with a customer 1 in a dialogue to address the customer 1's requests. As shown in FIG. 20, at time T+1, a notification may be generated, for example, by the notification management module notifying that another customer wishes to engage in a dialogue with the customer care specialist. As shown, the dialogue representation module 112 may be configured to display a darkened dot on in the view 221 to reflect such a notification. As also shown in FIG. 20, at time T+1, the customer 1 may interrupt the dialogue with the customer care specialist and pause the dialogue. As a result, the customer specialist may decide to move on to the next customer who wishes to dialogue with the customer specialist while the customer 1 is pausing the dialogue. Accordingly, the customer care specialist may scroll to the next dialogue for which the notification was generated to engage with customer 2 as shown in FIG. 21. FIG. 21 illustrates at time T+2, while the customer specialist is engaging in a dialogue with customer 2, a notification is generated and displayed in the view 221. In this example, the dot indicating the notification in the view 221 may be shaded to indicate the notification is for the dialogue with customer 1. In response to the notification, the customer care specialist may pause the dialogue with customer 2 and scroll to the dialogue with customer 1 as indicated by the indication arrow 710 displayed in the view 221. As shown in FIG. 22, at time T+3 the view 221 may present the dialogue between the customer care specialist and customer 1. As also shown, two more notifications are shown. Notice these dots are not shaded, which indicates that these are not rearranged dialogues and they are arranged solely based on the time they were received. In some other examples, special customers may be assigned to higher priorities than non-special ones. For example, customer 1 may be assigned to a higher priority since he was first in line ahead of customer 2 and 3 and his dialogue with the customer care specialist was interrupted. Special customers may be always assigned to an earlier position in the array than non-special ones such that they may be guaranteed to be ahead of non-special customers to communicate with customer care specialist. As shown in FIG. 23, while the customer special care specialist was engaging with customer 2 at time T+4, a shaded dot was generated and is display to the left of the non-shaded dot. This indicates to the customer care specialist that customer 1 just sent some messages to the customer care specialist and the dialogue is placed, e.g. in the array 202, ahead of the dialogue still waiting. As shown in FIGS. 22-25, the user interface 220 enables the customer care specialist to dialogue with customers in a linear mode efficiently. This mimics a fast line service wherein customers that are diverted to some other process when they were first engaged by the customer care specialist may rejoin the line ahead of those customers that have not been so diverted.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to present views of dialogues to a user, the system comprising:
    one or more processors configured to execute computer program modules comprising:
    a dialogue management module configured to determine an array to be associated with a plurality of dialogues between the user and other entities, the dialogues including a first and a second dialogue, wherein the individual dialogues are assigned dynamically to positions in the array based on time information associated with the individual dialogues, such that the first dialogue is dynamically assigned to a first position in the array based on time information associated with the first dialogue and the second dialogue is dynamically assigned to a second position in the array based on time information associated with the second dialogue;
    a dialogue representation module configured to define a user interface that conveys views of the dialogues to the user, wherein the views including a first view of the first dialogue and a second view of the second dialogue;
    a notification management module configured to generate notifications notifying the user of information regarding dialogues such that the notifications provide information about relative positions in the array of the dialogues for which notifications are generated with respect to a position in the array of a dialogue being presented in a current view, wherein the notification management module is configured such that, responsive to the first view being the current view in the user interface a notification generated for the second dialogue provides an indication of a direction of the second position of the second dialogue relative to the first position of the first dialogue being presented; and
    a user input module configured to determine a user's input received in the current view; and
    wherein the dialogue representation module is further configured to:
        define the user interface to convey the first view of the first dialogue to the user;
        in response to the notification management module's generation of a notification for the second dialogue, update the first view of the first dialogue to convey the notification of the second position of the second dialogue relative to the first position of the first dialogue; and
        in response to the user's input module's determination of the user's input, update the definition of the user interface to convey the second view of the second dialogue to the user in place of the first dialogue.

2. The system of claim 1, wherein the dynamic assignment of the array positions is made further based on criteria provided by the user.

3. The system of claim 1, wherein the notifications are generated based on information regarding the dialogues.

4. The system of claim 3, wherein the notifications are generated based on time information associated with the dialogues.

5. The system of claim 3, wherein the notifications are generated further based on criteria provided by the user.

6. The system of claim 1, wherein the notification management module is further configured to determine a period for a notification.

7. The system of claim 1, wherein the user input module is further configured to determine an offset based on the user input.

8. A method of presenting views of dialogues to a user wherein the method is implemented in a computer system comprising one or more processors configured to execute computer program modules, and wherein the method comprises:
    executing, on the one or more processors of the computer system, one or more computer program modules configured to:
    determine an array to be associated with a plurality of dialogues between the user and other entities, the dialogues including a first and a second dialogue, wherein the individual dialogues are dynamically assigned to positions in the array based on time information associated with the individual dialogues, such that the first dialogue is dynamically assigned to a first position in the array based on time information associated with the first dialogue and the second dialogue is dynamically assigned to a second position in the array based on time information associated with the second dialogue;
    define a user interface that conveys views of the dialogues to the user, wherein the views including a first view of the first dialogue and a second view of the second dialogue; and
    generate notifications notifying the user of information regarding dialogues such that the notifications provide information about relative positions in the array of the dialogues for which notifications are generated with respect to a position in the array of a dialogue being presented in a current view, wherein, responsive to the first view being the current view in the user interface a notification generated for the second dialogue provides an indication of a direction of the second position of the second dialogue relative to the first position of the first dialogue being presented; and
    wherein in response to the generation of a notification for the second dialogue, update the first view of the first dialogue to convey the notification of the second position of the second dialogue relative to the first position of the first dialogue;

receive a user input; and in response to a determination of the user's input, update the definition of the user interface to convey the second view of the second dialogue to the user in place of the first dialogue.

9. The method of claim 8, wherein the dynamic assignment of the array positions is made further based on criteria provided by the user.

10. The method of claim 8, wherein the notifications are generated based on information regarding the dialogues.

11. The method of claim 10, wherein the notifications are generated based on time information associated with the dialogues.

12. The method of claim 11, wherein the notifications are generated further based on criteria provided by the user.

13. The method of claim 8 further comprises executing, on the one or more processors of the computer system, one or more computer program modules configured to determine a period for a notification.

14. The method of claim 8, further comprising executing, on the one or more processors of the computer system, one or more computer program modules configured to determine an offset based on the user input.

* * * * *